United States Patent
Sakhnini et al.

(10) Patent No.: US 11,871,440 B2
(45) Date of Patent: Jan. 9, 2024

(54) DYNAMIC SLOT FORMAT CONFIGURATION

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Jun Ma, San Diego, CA (US); Xiaoxia Zhang, San Diego, CA (US); Hemant Saggar, Irvine, CA (US); Morteza Soltani, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/357,950

(22) Filed: Jun. 24, 2021

(65) Prior Publication Data
US 2022/0417935 A1    Dec. 29, 2022

(51) Int. Cl.
*H04W 72/0446*    (2023.01)
*H04W 72/23*    (2023.01)
*H04W 72/541*    (2023.01)
*H04W 72/51*    (2023.01)

(52) U.S. Cl.
CPC ..... *H04W 72/541* (2023.01); *H04W 72/0446* (2013.01); *H04W 72/23* (2023.01); *H04W 72/51* (2023.01)

(58) Field of Classification Search
None
See application file for complete search history.

(56) References Cited

U.S. PATENT DOCUMENTS

| | | | |
|---|---|---|---|
| 2018/0062811 A1* | 3/2018 | Akkarakaran | H04L 5/0007 |
| 2019/0254024 A1 | 8/2019 | Nam et al. | |
| 2019/0312665 A1 | 10/2019 | Jo et al. | |
| 2020/0169377 A1* | 5/2020 | Lee | H04W 56/0015 |
| 2020/0266917 A1* | 8/2020 | Liu | H04W 72/0446 |
| 2020/0374077 A1* | 11/2020 | Wang | H04W 72/0446 |
| 2021/0218494 A1* | 7/2021 | Liu | H04B 7/15542 |

(Continued)

OTHER PUBLICATIONS

International Search Report and Written Opinion—PCT/US2022/033036—ISA/EPO—dated Sep. 28, 2022 (2104042WO).

*Primary Examiner* — Duc T Duong
(74) *Attorney, Agent, or Firm* — QUALCOMM Incorporated

(57) ABSTRACT

Methods, systems, and devices for wireless communication are described. In some wireless communications systems, a base station may transmit, to a user equipment (UE), an indication of a dynamic switch between slot formats. The base station and the UE may communicate first data in one or more first slots according to a first slot format. The first slot format may be a first cyclic prefix-based or guard interval-based slot format. The base station may transmit control signaling to the UE to indicate a second slot format different from the first slot format. The second slot format may be a second cyclic prefix-based or guard interval-based slot format. The UE and the base station may switch to communicating second data in one or more second slots in accordance with the second slot format based on the control signaling.

27 Claims, 17 Drawing Sheets

(56) References Cited

U.S. PATENT DOCUMENTS

| | | | |
|---|---|---|---|
| 2021/0219187 A1* | 7/2021 | Lee | H04W 72/0446 |
| 2022/0053515 A1* | 2/2022 | Zhang | H04W 72/542 |
| 2022/0060277 A1* | 2/2022 | Wei | H04L 5/0094 |

* cited by examiner

DYNAMIC SLOT FORMAT CONFIGURATION

FIELD OF TECHNOLOGY

The following relates to wireless communication, including dynamic slot format configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may communicate in a set of transmission time intervals (TTIs). The base station may transmit a configuration for each TTI that indicates an allocation of uplink and downlink resources within the TTI. In some cases, the UE and the base station may communicate in relatively high frequency bands according to one or more different waveform types. For example, a first waveform type may support cyclic prefix-based waveforms and a second waveform type may support guard interval-based waveforms. However, if a system supports both such waveform types in a frequency band, wireless devices using different waveform types may potentially experience inter-symbol interference, symbol or slot misalignment, or some combination thereof, reducing communication reliability for the system.

SUMMARY

The described techniques relate to improved methods, systems, devices, and apparatuses that support dynamic slot format configuration. Generally, the described techniques provide for a base station to dynamically indicate a configuration for a slot format. The base station and a user equipment (UE) may communicate data during one or more slots in accordance with a first slot format. The first slot format may be a cyclic prefix-based or guard interval-based slot format. The base station, the UE, or both may determine to switch to communicating according to a second slot format that is different from the first slot format. The second slot format may correspond to a second cyclic prefix-based or guard interval-based slot format. In some examples, the switch may be based on a change in waveforms, a change in latency parameters, or other communication parameters. The base station may transmit control signaling to the UE to indicate the second slot format. The UE and the base station may communicate data in one or more second slots in accordance with the second slot format based on the UE receiving the control signaling. A slot as described herein may be any frame, subframe, symbol, set of symbols, or other transmission time interval (TTI). The slot format may correspond to a configuration of a slot, which may include a configuration of cyclic prefixes, guard intervals, symbols, discrete Fourier transform (DFT) windows, or any combination of these or other communication parameters within the slot. As such, by using control signaling indicating a configuration for a slot format, the base station and the UE may dynamically switch between slot formats during communications, which may reduce latency, reduce UE complexity, and improve communication reliability.

A method for wireless communication at a UE is described. The method may include communicating first data during a first slot in accordance with a first slot format, the first slot format corresponding to a first cyclic prefix-based or guard interval-based slot format, receiving control signaling that indicates a second slot format different from the first slot format, the second slot format corresponding to a second cyclic prefix-based or guard interval-based slot format, and communicating second data during a second slot in accordance with the second slot format in response to receiving the control signaling.

An apparatus for wireless communication at a UE is described. The apparatus may include a processor, memory coupled with the processor, and instructions stored in the memory. The instructions may be executable by the processor to cause the apparatus to communicate first data during a first slot in accordance with a first slot format, the first slot format corresponding to a first cyclic prefix-based or guard interval-based slot format, receive control signaling that indicates a second slot format different from the first slot format, the second slot format corresponding to a second cyclic prefix-based or guard interval-based slot format, and communicate second data during a second slot in accordance with the second slot format in response to receiving the control signaling.

Another apparatus for wireless communication at a UE is described. The apparatus may include means for communicating first data during a first slot in accordance with a first slot format, the first slot format corresponding to a first cyclic prefix-based or guard interval-based slot format, means for receiving control signaling that indicates a second slot format different from the first slot format, the second slot format corresponding to a second cyclic prefix-based or guard interval-based slot format, and means for communicating second data during a second slot in accordance with the second slot format in response to receiving the control signaling.

A non-transitory computer-readable medium storing code for wireless communication at a UE is described. The code may include instructions executable by a processor to communicate first data during a first slot in accordance with a first slot format, the first slot format corresponding to a first cyclic prefix-based or guard interval-based slot format, receive control signaling that indicates a second slot format different from the first slot format, the second slot format corresponding to a second cyclic prefix-based or guard interval-based slot format, and communicate second data during a second slot in accordance with the second slot format in response to receiving the control signaling.

In some examples of the method, apparatuses, and non-transitory computer-readable medium described herein, the second slot format may indicate to communicate using the second slot as a cyclic prefix-based slot, and communicating the second data may include operations, features, means, or instructions for communicating at least a portion of the second data and a corresponding cyclic prefix in one or more symbols of a set of multiple symbols of the second slot in accordance with the second slot format.

In some examples of the method, apparatuses, and non-transitory computer-readable medium described herein, the second slot format may indicate to communicate using the second slot as a non-slot contained guard interval-based slot, and communicating the second data may include operations, features, means, or instructions for communicating at least a portion of the second data and a corresponding guard interval in one or more symbols of a set of multiple symbols of the second slot in accordance with the second slot format, where a first guard interval corresponding to a first symbol of the set of multiple symbols may be communicated in a slot that may be prior to the second slot in time.

In some examples of the method, apparatuses, and non-transitory computer-readable medium described herein, the second slot format may indicate to communicate using the second slot as a slot contained guard interval-based slot, and communicating the second data may include operations, features, means, or instructions for communicating at least a first portion of the second data and a corresponding guard interval in one or more first symbols of a set of multiple symbols of the second slot in accordance with the second slot format.

In some examples of the method, apparatuses, and non-transitory computer-readable medium described herein, the second slot format may indicate a reduced symbol duration for one or more second symbols of the set of symbols of the second slot, and communicating the second data may include operations, features, means, or instructions for communicating at least a second portion of the second data and two or more guard intervals in the one or more second symbols having the reduced symbol duration in accordance with the second slot format, the second portion of the second data including fewer bits than the first portion of the second data based on the reduced symbol duration for the one or more second symbols.

In some examples of the method, apparatuses, and non-transitory computer-readable medium described herein, the second slot format may indicate a DFT window size for the second slot, and communicating the second data may include operations, features, means, or instructions for communicating at least the first portion of the second data and the corresponding guard interval in the one or more first symbols of the set of multiple symbols of the second slot in accordance with the DFT window size and the second slot format, where the DFT window size may be different from a first DFT window size corresponding to the first slot format.

In some examples of the method, apparatuses, and non-transitory computer-readable medium described herein, the second slot format may indicate a signaling period having a first duration that is different from a second duration of each symbol of the set of symbols of the second slot, and communicating the second data may include operations, features, means, or instructions for communicating a reference signal, at least a second portion of the second data, or any combination thereof during the signaling period, where the second slot format indicates a timing of the signaling period within the second slot.

In some examples of the method, apparatuses, and non-transitory computer-readable medium described herein, the second slot format may indicate a gap period having a first duration that is different from a second duration of each symbol of the set of symbols of the second slot, and communicating the second data may include operations, features, means, or instructions for refraining from communicating during the gap period, where the second slot format indicates a timing of the gap period within the second slot.

In some examples of the method, apparatuses, and non-transitory computer-readable medium described herein, the second slot format may indicate a second symbol duration for each symbol in the second slot that is different from a first symbol duration corresponding to the first slot format, and communicating the second data may include operations, features, means, or instructions for communicating at least a portion of the second data in one or more symbols of a set of multiple symbols of the second slot in accordance with the second symbol duration.

In some examples of the method, apparatuses, and non-transitory computer-readable medium described herein, a second slot duration of the second slot, a second quantity of symbols in the second slot, or both may be different from a first slot duration of the first slot, a first quantity of symbols in the first slot, or both based on the second symbol duration being different from the first symbol duration.

In some examples of the method, apparatuses, and non-transitory computer-readable medium described herein, the first symbol duration corresponds to a nominal symbol duration and the method, apparatuses, and non-transitory computer-readable medium may include further operations, features, means, or instructions for falling back to the nominal symbol duration based on a channel metric failing to satisfy a threshold and communicating third data in a third slot in accordance with the nominal symbol duration based on falling back to the nominal symbol duration.

In some examples of the method, apparatuses, and non-transitory computer-readable medium described herein, the second symbol duration may be an integer factor of the first symbol duration.

In some examples of the method, apparatuses, and non-transitory computer-readable medium described herein, the second slot format may indicate a second DFT window size for the second slot that is different from a first DFT window size for the first slot, and communicating the second data may include operations, features, means, or instructions for communicating at least a portion of the second data and a corresponding guard interval or cyclic prefix in one or more symbols of a set of multiple symbols of the second slot in accordance with the second DFT window size.

In some examples of the method, apparatuses, and non-transitory computer-readable medium described herein, the first DFT window size corresponds to a nominal DFT window size and the second DFT window size may be smaller than the nominal DFT window size by an amount that is greater than or equal to a duration of the corresponding guard interval or cyclic prefix.

Some examples of the method, apparatuses, and non-transitory computer-readable medium described herein may further include operations, features, means, or instructions for communicating two or more guard intervals, two or more cyclic prefixes, a reference signal, or any combination thereof in the one or more symbols of the set of multiple symbols of the second slot based on the amount by which the second DFT window size is smaller than the nominal DFT window size.

Some examples of the method, apparatuses, and non-transitory computer-readable medium described herein may further include operations, features, means, or instructions for receiving first control signaling configuring a set of multiple slot formats including at least the first slot format and the second slot format, where the control signaling may be second control signaling including an identifier indicating the second slot format from the set of multiple slot formats.

In some examples of the method, apparatuses, and non-transitory computer-readable medium described herein, a slot format of the set of multiple slot formats indicates a location and contents of one or more symbols having reduced symbol durations in the second slot.

Some examples of the method, apparatuses, and non-transitory computer-readable medium described herein may further include operations, features, means, or instructions for transmitting a UE capability report, where the control signaling indicating the second slot format may be received based on the UE capability report.

Some examples of the method, apparatuses, and non-transitory computer-readable medium described herein may further include operations, features, means, or instructions for transmitting a UE assistance information message requesting the second slot format, where the control signaling indicating the second slot format may be received based on the UE assistance information message.

Some examples of the method, apparatuses, and non-transitory computer-readable medium described herein may further include operations, features, means, or instructions for applying the second slot format to the second slot a time period after receiving the control signaling, where the time period may be indicated by the control signaling, may be based on a UE capability, or both.

In some examples of the method, apparatuses, and non-transitory computer-readable medium described herein, the control signaling indicates an applicability of the second slot format and the second slot format applies to one or more multiple input-multiple output (MIMO) layers, one or more transmission configuration indicator (TCI) states, one or more frequency sub-bands, one or more UE antenna panels, or any combination thereof based on the applicability of the second slot format.

In some examples of the method, apparatuses, and non-transitory computer-readable medium described herein, the first data and the second data may be communicated in frequency range 2 (FR2).

A method for wireless communication at a base station is described. The method may include communicating, with a UE, first data during a first slot in accordance with a first slot format corresponding to a first cyclic prefix-based or guard interval-based slot format, transmitting, to the UE, control signaling that indicates a second slot format different from the first slot format, the second slot format corresponding to a second cyclic prefix-based or guard interval-based slot format, and communicating, with the UE, second data during a second slot in accordance with the second slot format based on transmitting the control signaling.

An apparatus for wireless communication at a base station is described. The apparatus may include a processor, memory coupled with the processor, and instructions stored in the memory. The instructions may be executable by the processor to cause the apparatus to communicate, with a UE, first data during a first slot in accordance with a first slot format corresponding to a first cyclic prefix-based or guard interval-based slot format, transmit, to the UE, control signaling that indicates a second slot format different from the first slot format, the second slot format corresponding to a second cyclic prefix-based or guard interval-based slot format, and communicate, with the UE, second data during a second slot in accordance with the second slot format based on transmitting the control signaling.

Another apparatus for wireless communication at a base station is described. The apparatus may include means for communicating, with a UE, first data during a first slot in accordance with a first slot format corresponding to a first cyclic prefix-based or guard interval-based slot format, means for transmitting, to the UE, control signaling that indicates a second slot format different from the first slot format, the second slot format corresponding to a second cyclic prefix-based or guard interval-based slot format, and means for communicating, with the UE, second data during a second slot in accordance with the second slot format based on transmitting the control signaling.

A non-transitory computer-readable medium storing code for wireless communication at a base station is described. The code may include instructions executable by a processor to communicate, with a UE, first data during a first slot in accordance with a first slot format corresponding to a first cyclic prefix-based or guard interval-based slot format, transmit, to the UE, control signaling that indicates a second slot format different from the first slot format, the second slot format corresponding to a second cyclic prefix-based or guard interval-based slot format, and communicate, with the UE, second data during a second slot in accordance with the second slot format based on transmitting the control signaling.

In some examples of the method, apparatuses, and non-transitory computer-readable medium described herein, the second slot format may indicate to communicate using the second slot as a cyclic prefix-based slot, and communicating the second data may include operations, features, means, or instructions for communicating at least a portion of the second data and a corresponding cyclic prefix in one or more symbols of a set of multiple symbols of the second slot in accordance with the second slot format.

In some examples of the method, apparatuses, and non-transitory computer-readable medium described herein, the second slot format may indicate to communicate using the second slot as a non-slot contained guard interval-based slot, and communicating the second data may include operations, features, means, or instructions for communicating at least a portion of the second data and a corresponding guard interval in one or more symbols of a set of multiple symbols of the second slot in accordance with the second slot format, where a first guard interval corresponding to a first symbol of the set of multiple symbols may be communicated in a slot that may be prior to the second slot in time.

In some examples of the method, apparatuses, and non-transitory computer-readable medium described herein, the second slot format may indicate to communicate using the second slot as a slot contained guard interval-based slot, and communicating the second data may include operations, features, means, or instructions for communicating at least a portion of the second data and a corresponding guard interval in one or more symbols of a set of multiple symbols of the second slot in accordance with the second slot format.

In some examples of the method, apparatuses, and non-transitory computer-readable medium described herein, the second slot format may indicate a second symbol duration for each symbol in the second slot that is different from a first symbol duration corresponding to the first slot format, and communicating the second data may include operations, features, means, or instructions for communicating at least a portion of the second data in one or more symbols of a set of multiple symbols of the second slot in accordance with the second symbol duration.

In some examples of the method, apparatuses, and non-transitory computer-readable medium described herein, the second slot format may indicate a second DFT window size for the second slot that is different from a first DFT window size for the first slot, and communicating the second data may include operations, features, means, or instructions for communicating at least a portion of the second data and a corresponding guard interval or cyclic prefix in one or more symbols of a set of multiple symbols of the second slot in accordance with the second DFT window size.

DETAILED DESCRIPTION

Figure 1:
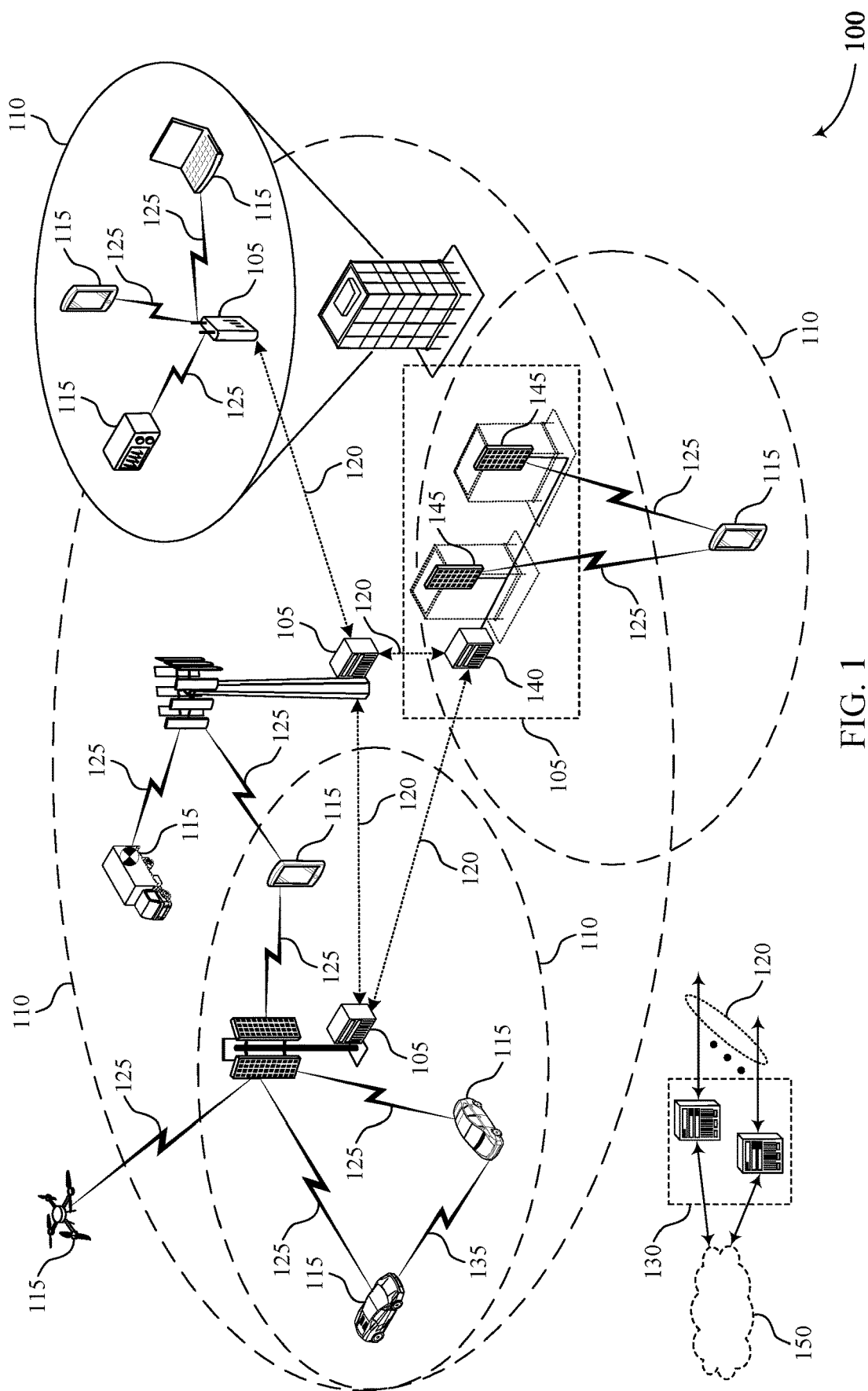
FIGS. 1 and 2 illustrate examples of wireless communications systems that support dynamic slot format configuration in accordance with aspects of the present disclosure.

In some wireless communications systems, a user equipment (UE) and a base station may communicate within one or more slots in accordance with a slot format. As used herein, a slot may correspond to one or more symbols, one or more subframes, one or more frames, or any other transmission time interval (TTI). In some examples, UEs and base stations in a wireless communications system may communicate according to multiple different waveforms to increase bandwidth in higher frequency bands, and each waveform may support a different slot format. For example, each waveform may correspond to a different configuration of cyclic prefixes, guard intervals, or both. Additionally or alternatively, different slot formats may correspond to different symbol durations, discrete Fourier transform (DFT) window sizes, other communication parameters, or any combination thereof. However, if a system supports multiple such slot formats for different waveform types in a frequency band, wireless devices using different waveform types in the frequency band may potentially experience inter-symbol interference, symbol or slot misalignment, or some combination thereof, reducing communication reliability for the system.

To support efficient communications, a base station as described herein may transmit control signaling to a UE to indicate a dynamic switch between slot formats. The control signaling may indicate a slot format, which may correspond to a configuration of cyclic prefixes, guard intervals, symbol durations, DFT window sizes, other communication parameters, or any combination thereof in a slot (e.g., symbol, set of symbols, frame, subframe, or any other TTI). The dynamic indication of a slot format may provide for reduced latency, reduced complexity, and improved coordination between devices during wireless communications. For example, the configured slot formats may support symbol-level alignment across different slot formats, slot-level alignment across different slot formats, inter-symbol and inter-slot interference mitigation between different slot formats, or some combination thereof. In some examples, the base station may transmit a first control signal that indicates a set of slot configurations and a second control signal that configures a UE to use a specific slot format from the set. Alternatively, the base station may transmit a control signal that includes fields configured to dynamically indicate a configuration for the slot format. In some examples, the slot format may be based on a UE capability report, UE assistance information indicating a slot format preferred by the UE, or both. The configured slot format may apply to all communications by the UE or may apply to a subset of communications indicated via the control signaling. For example, the subset of communications may include a subset of indicated multiple-input multiple-output (MIMO) layers, transmission configuration indicator (TCI) states (e.g., beams), sub-bands, UE antenna panels, or any combination thereof.

The configuration for the slot format may indicate a cyclic prefix-based slot format, a slot contained guard interval-based slot format, a non-slot contained guard interval-based slot format, or some other slot format. The UE and the base station may communicate data and a corresponding cyclic prefix or guard interval in each symbol of a slot based on the indicated format. Additionally or alternatively, the slot format may indicate a symbol duration for one or more symbols in the slot, a DFT window size for the slot, or both. The symbol duration, the DFT window size, or both may be different from a nominal symbol duration or DFT window size (e.g., pre-configured at a UE), respectively, and may provide for reduced latency, reduced UE complexity, improved beam switching, transmission of extra reference signals, or any combination thereof. In some examples, the indicated symbol duration or DFT window size may apply to each symbol or DFT window, respectively, for a slot. Alternatively, the control signaling may indicate one or more symbols or DFT windows having the changed symbol duration or DFT window size in the slot.

Aspects of the disclosure are initially described in the context of wireless communications systems. Additional aspects are described with reference to slot formats, communication timelines, DFT window configurations, and process flows. Aspects of the disclosure are further illustrated by and described with reference to apparatus diagrams, system diagrams, and flowcharts that relate to dynamic slot format configuration.

FIG. 1 illustrates an example of a wireless communications system 100 that supports dynamic slot format configuration in accordance with aspects of the present disclosure.

The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported DFT size (e.g., DFT window size). Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems 100, a base station 105 may dynamically indicate a configuration for a slot format during communications with a UE 115. For example, the base station 105 and the UE 115 may communicate data during one or more first slots in accordance with a first slot format. The first slot format may be a cyclic prefix-based or guard interval-based slot format. The base station 105, the UE 115, or both may determine to switch to communications according to a second slot format that is different from the first slot format. The second slot format may correspond to a second cyclic prefix-based or guard interval-based slot format. In some examples, the switch may be based on a change in waveforms, a change in latency thresholds, a change in bandwidth allocations, or some other communication parameters. The base station 105 may transmit control signaling to the UE 115 to indicate the second slot format. The UE 115 and the base station 105 may communicate data in one or more second slots in accordance with the second slot format based on receiving the control signaling. A slot as described herein may be any combination of one or more symbols, one or more frames, one or more subframes, or any other TTI. The slot format may correspond to a configuration of a slot, which may include a configuration of cyclic prefixes, guard intervals, symbols, DFT windows, other communication parameters, or any combination thereof within the slot. As such, by communicating control signaling indicating a configuration for a slot format, the base station 105 and the UE 115 may dynamically switch between slot formats during communications, which may reduce latency, reduce UE complexity, and improve communication reliability. Additionally, by supporting specific configurations of slot formats, the wireless communications system 100 may provide for concurrent communications in a frequency band using different waveforms, different slot formats, or both.

Figure 2:
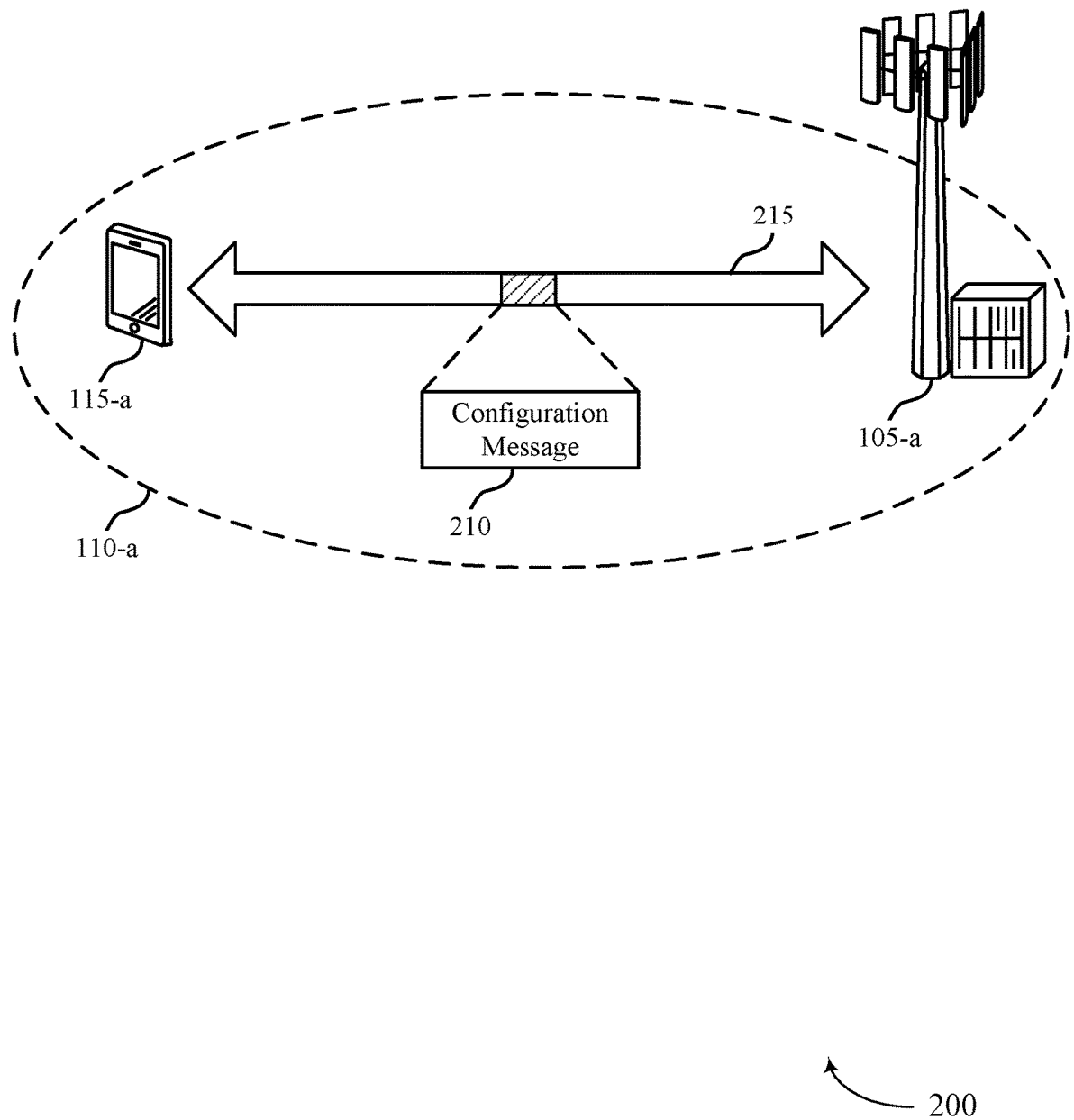

FIG. 2 illustrates an example of a wireless communications system 200 that supports dynamic slot format configuration in accordance with aspects of the present disclosure. The wireless communications system 200 may include a base station 105-a and a UE 115-a, which may represent examples of a base station 105 and a UE 115 as described with reference to FIG. 1. The base station 105-a and the UE 115-a may communicate within a geographic coverage area 110-*a* and via a communication link 215. In some examples, the base station 105-*a* may transmit a configuration message 210 to the UE 115-*a* to indicate a configuration for a slot format.

The UE 115-*a* and the base station 105-*a* may communicate via the communication link 215 in accordance with one or more different types of waveforms. In some examples, the UE 115-*a* and the base station 105-*a* may communicate over a relatively higher operating frequency band, such as frequency range 2 (FR2), using one or more waveforms that support uplink communications, downlink communications, or both. The waveforms may include a cyclic prefix-OFDM waveform, a single carrier frequency domain waveform (e.g., DFT-s-OFDM), a single carrier time domain waveform (e.g., single carrier quadrature amplitude modulation (SC-QAM)), or any combination thereof. Each waveform may support one or more different slot formats. A slot format as described herein may correspond to a configuration of cyclic prefixes, guard intervals, symbols, DFT windows, other communication parameters, or any combination thereof within a slot of any length or partitioning (e.g., spanning any number of symbols, subframes, frames, or any other TTI).

The cyclic prefix-OFDM waveform may correspond to a cyclic prefix-based slot format. That is, each symbol in a slot may be transmitted with a corresponding cyclic prefix. The cyclic prefix-OFDM waveform may provide for a UE 115-*a* to perform a single tap frequency domain equalizer (FDE) operation. The cyclic prefix-OFDM may additionally or alternatively provide support for efficient bandwidth utilization (e.g., based on using a reduced guard band bandwidth), FDM between wireless devices, and relatively high order MIMO (e.g., above a MIMO order threshold). Communications in relatively higher frequency bands may result in relatively high phase noise and relatively wide operating bandwidths as compared to lower frequency bands. To account for the relatively high phase noise and relatively wide bandwidth, the cyclic prefix-OFDM waveform may support a relatively large subcarrier spacing (SCS) as compared with other waveforms.

The single carrier frequency domain waveform may support a cyclic prefix-based slot format or a guard interval-based slot format. The single carrier frequency domain waveform may provide for a UE 115-*a* to perform a single tap FDE operation and may provide for efficient bandwidth utilization (e.g., including a reduced guard band bandwidth), lower peak-to-average power ratio (PAPR) (e.g., compared to some other waveforms), FDM between wireless devices, or any combination thereof. The single carrier frequency domain waveform may operate according to a relatively large SCS as compared to other waveforms, which may support communications in higher frequency bands, similar to the cyclic prefix-OFDM waveform as described herein.

The single carrier time domain waveform may support a cyclic prefix-based slot format or a guard interval-based slot format. The single carrier time domain waveform may be a relatively low complexity waveform (e.g., involving relatively low UE processing overhead) as compared with other waveforms. For example, the single carrier time domain waveform may include motivation symbols for decoding the waveform, and the UE 115-*a* may refrain from performing fast Fourier transform (FFT) or inverse FFT (IFFT) operations for decoding the waveform. The single carrier time domain waveform may support a single tap FDE or time domain equalizer (TDE) operation by the UE 115-*a*. The single carrier time domain waveform may support a relatively lower signal to noise ratio (SNR) and PAPR than other waveforms. For example, time domain filtering may be performed for the single carrier time domain waveform to achieve a relatively low PAPR. In some cases, the single carrier time domain waveform may support FDM between wireless devise using extra guard bands.

The UE 115-*a* and the base station 105-*a* may dynamically or semi-statically switch between waveforms for communications based on time or frequency regions, SNR metrics, or other communication parameters. For example, if the UE 115-*a* detects a relatively low SNR, the UE 115-*a* may switch from communicating according to a first waveform to communicating according to the single carrier time domain waveform. If the UE 115-*a* switches between waveforms, a corresponding slot format may change dynamically or semi-statically. In some examples, the UE 115-*a* may switch between a cyclic prefix-based slot format and a guard interval-based slot format.

In some cases, in addition to or as an alternative to switching between waveforms, the UE 115-*a* and the base station 105-*a* may switch between slot formats to support reduced latency, reduced UE complexity, efficient beam switching, transmission of extra reference signals, or any combination thereof. In some cases, the base station 105-*a* may transmit control signaling to indicate a configuration of uplink and downlink symbols in each slot.

To provide for efficient slot format switching and improved coordination between devices, the base station 105-*a* as described herein may transmit control signaling (e.g., RRC, MAC control element (MAC-CE), downlink control information (DCI), or other control signaling) that includes the configuration message 210 to the UE 115-*a* to indicate a slot format. A slot as described herein may represent an example of a slot, a sub-slot, a subframe, a frame, or any other TTI. A configuration for a slot format may indicate a configuration of guard intervals, cyclic prefixes, symbol sizes of one or more symbols in the slot, DFT sizes associated with one or more DFT windows in the slot, other parameters associated with communications in the slot, or any combination thereof. For example, the configuration message 210 may indicate a cyclic prefix-based slot format, a non-slot contained guard interval-based slot format, a slot contained guard interval-based slot format, a slot format having different symbol durations, a slot format corresponding to different DFT window sizes, other slot formats, or any combination thereof. Examples of different slot format configurations and corresponding communication parameters are described in further detail elsewhere herein, including with reference to FIGS. 3 through 5.

In the example of FIG. 2, the UE 115-*a* and the base station 105-*a* may communicate according to a first slot format, and the configuration message 210 may indicate a second slot format that is different from the first slot format. The UE 115-*a* and the base station 105-*a* may switch to communicating in accordance with the second slot format based on the configuration message 210. In some examples, the base station 105-*a* may transmit the configuration message 210 to indicate a format for each slot, a subset of slots, or both. The configuration message 210 may additionally or alternatively indicate a default slot format, such that the UE 115-*a* and the base station 105-*a* may communicate according to a configured slot format for a quantity of slots before switching to the default slot format. Alternatively, the UE 115-*a* may be pre-configured with a default slot format. A slot format may be configured for uplink and downlink separately, or the base station 105-*a* may configure a slot format for both uplink and downlink communications.

In some examples, the base station 105-*a* may transmit a first control signal (e.g., an RRC configuration message) that configures a set of multiple slot formats for the UE 115-*a*. For example, the first control signal may configure the UE 115-*a* with a set of code-points, and each code-point may represent one or more symbol or slot configurations. The base station 105-*a* may subsequently transmit a second control signal (e.g., a DCI message) that includes the configuration message 210 and that indicates a selected slot format from the set of configured slot formats. The configuration message 210 may include a field configured to convey an identifier (e.g., corresponding to a code-point) associated with the selected slot format. Each slot format of the set of configured slot formats may indicate a type of the slot format (e.g., cyclic prefix-based, guard interval-based, or another type), a quantity of symbols, a location and contents of one or more symbols in the slot, a location and size of one or more DFT windows in the slot, or any combination thereof.

Additionally or alternatively, the base station 105-*a* may transmit control signaling, such as DCI signaling, RRC signaling, or a MAC-CE, that includes one or more fields configured to dynamically indicate a configuration for a slot format. The base station 105-*a* may transmit the configuration message 210 based on a change in one or more communication metrics, scheduling information, a UE capability message, a UE assistance information message, or any combination thereof.

In some examples, the UE 115-*a* may transmit a UE capability report to the base station 105-*a*. The UE capability report may indicate one or more UE capabilities, one or more UE preferences, or both associated with one or more specific slot formats supported by the UE 115-*a* according to the one or more UE capabilities, one or more UE preferences, or both. The base station 105-*a* may transmit the configuration message 210 indicating a selected slot format based on the UE capability report. Additionally or alternatively, the UE 115-*a* may transmit UE assistance information to the base station 105-*a* to request a slot format. The UE 115-*a* may request a slot format based on a set of configured metrics, thresholds, or other parameters (e.g., rules for selecting a slot format) that may be configured for the UE 115-*a* or indicated to the UE 115-*a* via control signaling. In some examples, the UE assistance information indicating the requested slot format may correspond to an antenna panel or a group of antenna panels at the UE 115-*a*.

The UE 115-*a* may apply the slot format indicated via the configuration message 210 at a time period after receiving the control signaling that conveys the configuration message 210. In some examples, a duration of the time period may be based on a UE capability of the UE 115-*a*. Additionally or alternatively, the duration of the time period may be indicated via the configuration message 210 or some other control signaling transmitted to the UE 115-*a*. That is, the UE 115-*a* may insert a gap between receiving the configuration message 210 and switching a slot format for communications in response to the configuration message 210, for example, to mitigate communication losses, support a latency overhead for performing the switch, or both.

The configuration message 210 may indicate an applicability of the slot format. In some examples, the slot format may be applied to any communications between the UE 115-*a* and the base station 105-*a*. Additionally or alternatively, the slot format may be applied to a subset of communication types that may be indicated via the configuration message 210. For example, the slot format may be applied to one or more indicated MIMO layers, TCI states, beams, frequency sub-bands, UE antenna panels, communication directions, or any combination thereof.

By transmitting and receiving the configuration message 210, respectively, the base station 105-*a* and the UE 115-*a* may support dynamic switching between slot formats during communications. The slot format indication transmitted via the configuration message 210 may provide for reduced latency, improved coordination between devices, and improved communication reliability. In some examples, the dynamic slot format switching techniques described herein may provide for improved communications using multiple waveform types in relatively higher frequency bands (e.g., FR2).

Figure 3:
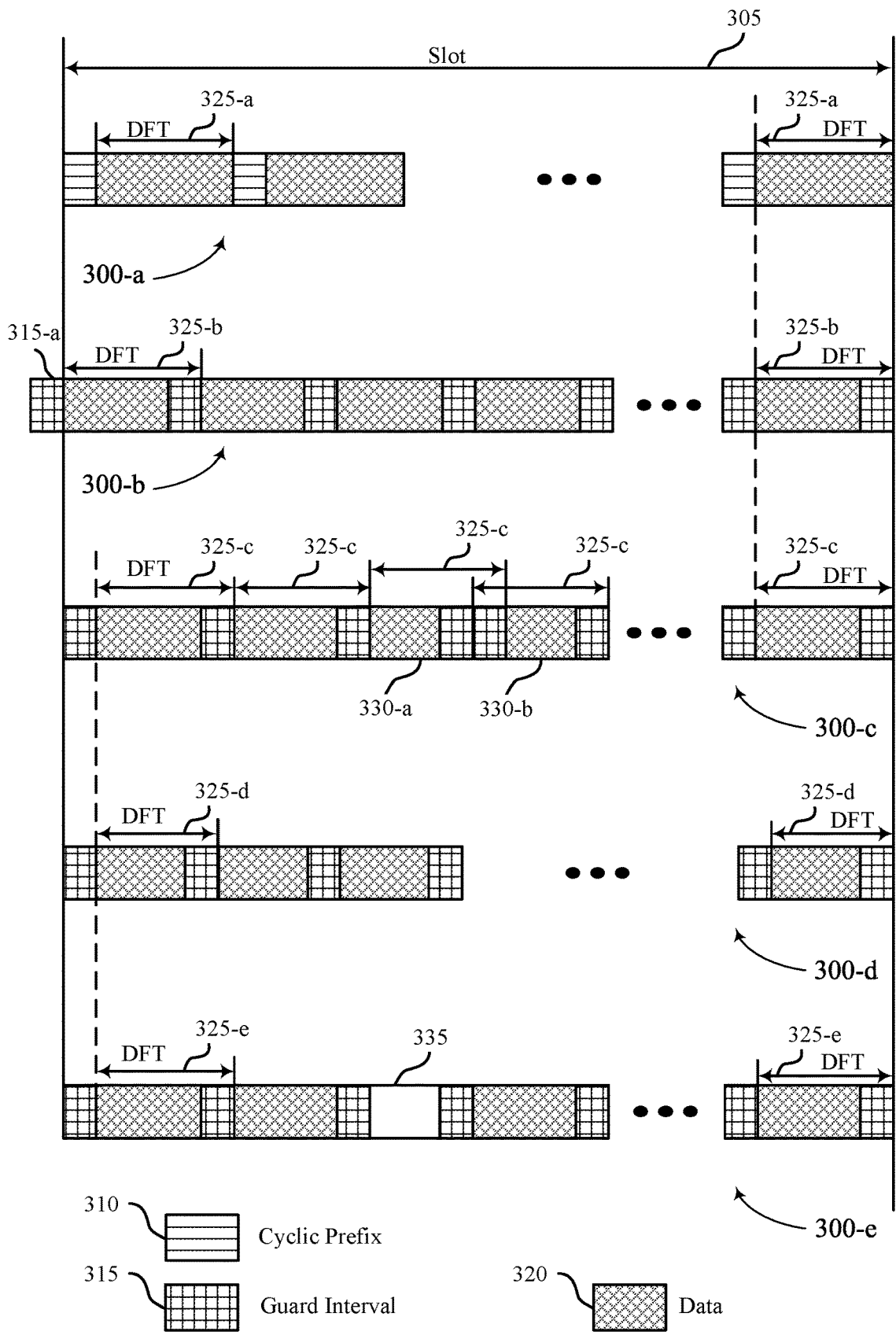
FIG. 3 illustrates examples of slot formats that support dynamic slot format configuration in accordance with aspects of the present disclosure.

FIG. 3 illustrates examples of slot formats 300-*a* through 300-*e* that support dynamic slot format configuration in accordance with aspects of the present disclosure. The slot formats 300 may represent example configurations of a slot 305 for communications between a UE 115 and a base station 105. The UE 115 and the base station 105 may be examples of a UE 115 and a base station 105 as described with reference to FIGS. 1 and 2. In some examples, the base station 105 may transmit an indication of a slot format 300 to the UE 115, as described with reference to FIG. 2. In some examples, the slot formats 300 may support symbol-level alignment across different slot formats 300, slot-level alignment across different slot formats 300, inter-symbol interference mitigation, or some combination thereof to support coordination between wireless devices operating in a frequency band using different formats of the slot formats 300.

The slot formats 300 illustrate example configurations of symbols, cyclic prefixes 310, guard intervals 315, additional periods 335, or any combination thereof within a slot 305. As described with reference to FIG. 2, the slot 305 may represent a slot, sub-slot, subframe, frame, or any other TTI, and the slot format configuration may be applied to TTIs of any duration and that include any quantity of symbols.

As described with reference to FIG. 2, the base station 105 may transmit control signaling (e.g., RRC, DCI, MAC-CE, or any combination thereof) to dynamically adapt or switch a slot format. The slot formats 300 illustrated in FIG. 3 may represent examples of cyclic prefix-based slots and different types of guard interval-based slots. For example, the slot format 300-*a* illustrates an example of a cyclic prefix-based slot format 300-*a*. The slot format 300-*b* illustrates an example of a non-slot contained guard interval-based slot format 300-*b*. The slot formats 300-*c*, 300-*d*, and 300-*e* each illustrate examples of slot-contained guard interval-based slot formats 300.

The cyclic prefixes 310 or guard intervals 315 in each slot 305 may transform a linear convolution of a transmitted symbol to a circular convolution, which may reduce complexity for a receiver. For example, a receiving device may perform a one-tap FDE to decode the symbol. The cyclic prefixes 310 or guard intervals 315 in each symbol of a slot 305 may additionally or alternatively reduce inter-symbol interference and maintain alignment between symbols and slots 305. As described with reference to FIG. 2, different types of waveforms for communications between the UE 115 and the base station 105 may support cyclic prefix-based slots, guard interval-based slots, or both. Accordingly, the base station 105 and the UE 115 may switch between cyclic prefix-based slots and guard interval-based slots based on scheduling information, waveforms used for communications, or other communication metrics.

The slot format 300-*a* may be a cyclic prefix-based slot format 300-*a*. Each slot 305 configured according to the slot format 300-*a* may include a quantity of symbols that each contain data 320 and a corresponding cyclic prefix 310. A cyclic prefix 310 may include a repetition of an ending portion of each symbol. That is, a last few bits or samples of the data 320 in each symbol may be repeated in the cyclic prefix 310 that occurs prior to the symbol in time. Accordingly, the cyclic prefixes 310 may include random data, and a base station 105 may not transmit new information or data via the cyclic prefixes 310. As such, inclusion of the cyclic prefixes 310 may increase overhead but may improve decoding reliability. The cyclic prefix-based slot format 300-*a* may be a slot-contained format, such that each cyclic prefix 310 and corresponding data 320 may be contained within the slot 305, and interference between slots 305 may be avoided (or otherwise reduced).

A cyclic prefix 310 may be set to one or more different durations. A slot 305 that includes cyclic prefixes 310 having a first duration (e.g., a normal cyclic prefix duration) may include a first quantity of symbols (e.g., 14 OFDM symbols per slot 305). A slot 305 that includes cyclic prefixes 310 having a second duration that is longer than the first duration (e.g., an extended cyclic prefix) may include a second quantity of symbols that is less than the first quantity (e.g., 12 OFDM symbols per slot 305). To maintain a fixed DFT window size 325-*a* for the slot 305 (e.g., for performing efficient FFT operations by a UE 115), the cyclic prefixes 310 may each be the same duration within a slot 305. Using the same cyclic prefix 310 lengths within a slot 305 may reduce overhead and UE complexity associated with modulation, demodulation, or both as compared to a slot including cyclic prefixes 310 having different lengths (e.g., resulting in a change in symbol lengths, a change in DFT window sizes 325, or both within the slot).

The slot format 300-*b* may be a non-slot contained guard interval-based slot format 300-*b*. A slot 305 that is configured according to the slot format 300-*b* may include a quantity of symbols that each include data 320 (e.g., 15 OFDM symbols per slot 305) and a corresponding guard interval 315. A guard interval 315 for a first symbol in the slot 305 may be included in a prior slot. For example, the guard interval 315-*a* may be included in a slot that occurs before the slot 305 in time. A transmitting device may configure the guard intervals 315 by inserting a sequence of data (e.g., known data) to an end of each symbol in the slot 305 before performing a DFT. As such, the information in each guard interval 315 may be utilized for synchronization, channel estimation, phase tracking, or other applications, which may reduce overhead as compared with cyclic prefix-based slot formats 300, such as the slot format 300-*a*.

Due to the insertion of the guard interval 315 before performing DFT, a duration of a guard interval 315 may vary symbol-to-symbol in a slot 305, and the symbol duration and DFT window size 325-*b* may remain constant. The guard interval-based slot format 300-*b* may thereby adapt to delay spreads without changing a symbol duration, which may provide for improved communication reliability and reduced latency. A receiving device may perform DFT according to the DFT window size 325-*b* to obtain the data 320 in each symbol, and the receiving device may discard the guard interval 315.

In some cases, a slot that is before the slot 305 in time (e.g., slot n−1) may not include data transmissions and corresponding guard intervals 315 (e.g., communications may be limited to a current slot n, or communications in the previous slot may not involve a waveform including guard intervals 315). In such cases, the first symbol in the slot 305 (e.g., slot n) may not have a corresponding guard interval 315 in the prior slot (e.g., the guard interval 315-*a* may not be configured). Accordingly, the non-slot contained guard interval-based slot format 300-*b* may not be supported when a prior slot does not contain data. In some examples, if the base station 105 determines that a data transmission is not scheduled in a prior slot, the base station 105 may refrain from configuring the non-slot contained guard interval-based slot format 300-*b* for the slot 305. Instead, the base station 105 may configure the slot format 300-*a* or one of the slot formats 300-*c*, 300-*d*, and 300-*e*. Alternatively, if the base station 105 determines that no communications are scheduled for the prior slot that may interfere with a specific UE 115, the base station 105 may configure the UE 115 to transmit the guard interval 315-*a* in the prior slot to support the slot format 300-*b*.

The slot formats 300-*c*, 300-*d*, and 300-*e* represent examples of slot contained guard interval-based slot formats 300, in which each segment of data 320 and corresponding guard interval 315 are included in a same slot 305. The slot formats 300-*c*, 300-*d*, and 300-*e* may be configured according to different symbol sizes, different applied DFT window sizes 325, different guard interval 315 configurations, or any combination thereof as compared to the slot format 300-*b*. Such differences may provide for the data 320 and guard intervals 315 to be included in the slot 305 (e.g., rather than using a guard interval 315-*a* from a different slot).

The slot format 300-*c* illustrates a slot contained guard interval-based slot format 300-*c* that includes some reduced symbol durations 330-*a* and 330-*b*. The slot format 300-*c* may provide for a wireless device to use a fixed DFT window size 325-*c* in the slot 305. In some examples, the DFT window size 325-*c* may be configured to include a same duration as the DFT window size 325-*a* for the cyclic prefix-based slot format 300-*a*. A first guard interval 315 for the first symbol in the slot 305 may be included in the slot 305, instead of in a prior slot, as described with reference to the non-slot contained guard interval-based slot format 300-*b*. The first guard interval 315 and the remaining guard intervals 315 may be included in a same slot 305 due to some symbols in the slot 305 having the reduced symbol durations 330 and overlapping guard intervals 315. In other words, the slot format 300-*c* may include a same quantity of symbols (e.g., 15 OFDM symbols) as the non-slot contained guard interval-based slot format 300-*b*, may include a fixed DFT window size 325-*c*, or both, and may be contained within a same slot 305.

The reduced symbol durations 330 may correspond to symbols that have a shorter length than other symbols in the slot. For example, the reduced symbol durations 330 may include data 320 having fewer bits than data 320 in other symbols in the slot 305. The reduced symbol durations 330 may correspond to two or more guard intervals 315. That is, a guard interval 315 may be repeated across the reduced symbol durations 330 such that the DFT window size 325-*c* may remain fixed while still being preceded by one guard interval 315 and including a second guard interval 315 at the end of the DFT window.

The reduced symbol durations 330 may be located in any symbol of the slot 305 and may include data 320, reference signal transmissions, null resources (e.g., gap periods), other transmissions, or any combination thereof. Although two reduced symbol durations 330-*a* and 330-*b* are illustrated in FIG. 2, it is to be understood that any quantity of symbols may be configured to include a reduced symbol duration 330, and the duration 330 may be any configured time period. The quantity of reduced symbol durations 330 and the length of each reduced symbol duration 330 may be based on a quantity of symbols in the slot 305, a symbol duration, a length of the slot 305, a length of each guard interval 315, or any combination thereof. A configuration for the slot format 300-c may indicate a location and contents of the reduced symbol durations 330.

The slot format 300-d illustrates an example of a slot contained guard interval-based slot 305 that includes a DFT window size 325-d and a symbol duration that are different from the DFT window size 325-a and symbol duration configured for the cyclic prefix-based slot format 300-a. Although the DFT window size 325-d illustrated in FIG. 3 is shorter than the DFT window size 325-a, it is to be understood that, in some examples, the DFT window size 325-d may be configured to be larger than the DFT window size 325-a. The base station 105 may transmit control signaling indicating a configuration for the slot format 300-d, a duration of the changed DFT window size 325-d, a duration of each symbol in the slot, or any combination thereof.

The DFT window size 325-d and the symbol duration may be the same for each symbol in the slot 305 in accordance with the slot format 300-d. By supporting the reduced DFT window size 325-d and symbol duration, the slot format 300-d may provide for each guard interval 315 and corresponding data 320 to be contained within a same slot 305 while maintaining a same quantity of symbols (e.g., 15 OFDM symbols) in the slot 305 as the non-slot contained guard interval-based slot format 300-b. In some examples, the slot format 300-d may support communications having relatively small data sizes, or applications in which a receiving device is capable of dynamically switching between DFT window sizes 325 between slots 305 (e.g., the receiving device may support a non-nominal DFT window size 325-d).

The slot format 300-e illustrates another example of a slot contained guard interval-based slot 305. The slot format 300-e may correspond to a DFT window size 325-e that is fixed for each symbol in the slot 305. In some examples, the DFT window size 325-e may be the same as the DFT window size 325-a for the cyclic prefix-based slot format 300-a. The slot format 300-e may support containment of each guard interval 315 within the slot 305 by including an additional period 335 that includes a duration that is different from a duration of each symbol in the slot 305. That is, the slot format 300-e may support transmission of fewer symbols than the non-slot contained guard interval-based slot format 300-b (e.g., 14 OFDM symbols instead of 15 OFDM symbols). However, the DFT window size 325-e and the symbol duration of each symbol in the slot may be the same.

The additional period 335 may be allocated for transmission of a reference signal, a portion of data 320, or some other transmission having a reduced duration. Additionally or alternatively, the additional period 335 may be a gap period that includes null resources (e.g., a beam switching gap, an uplink and downlink switching gap, or some other gap period), and the transmitting and receiving devices may refrain from communicating during the gap period. If data 320 or a reference signal is transmitted via the additional period 335, a different (e.g., reduced) DFT window size 325 than the DFT window size 325-e may be used by a receiving device to demodulate the signal in the additional period 335. As such, the DFT window size 325 may, in some examples, not be fixed for each symbol within a slot 305 according to the slot format 300-e. The base station 105 may transmit control signaling to the UE 115 to indicate a configuration for the slot format 300-e. The configuration may indicate a timing and contents of the additional period 335.

Although configurations for five example slot formats 300 are illustrated, it is to be understood that any quantity of slot formats 300 corresponding to any set of communication parameters may be supported. Each slot format 300 may be beneficial for different communication scenarios. As described herein, to improve communication reliability and reduce latency, the base station 105 may dynamically adapt a slot format 300 between a cyclic prefix-based slot format 300 (e.g., the slot format 300-a) and different types of guard interval-based slot formats 300 (e.g., the slot formats 300-b, 300-c, 300-d, and 300-e).

The base station 105 may transmit control signaling comprising a configuration message to indicate a switch in slot formats 300 based on one or more communication metrics. As such, the base station 105 and the UE 115 may communicate according to a slot format 300 that provides for reduced latency, reduced complexity, and improved communication reliability for each potential set of communication metrics.

Figure 4A:
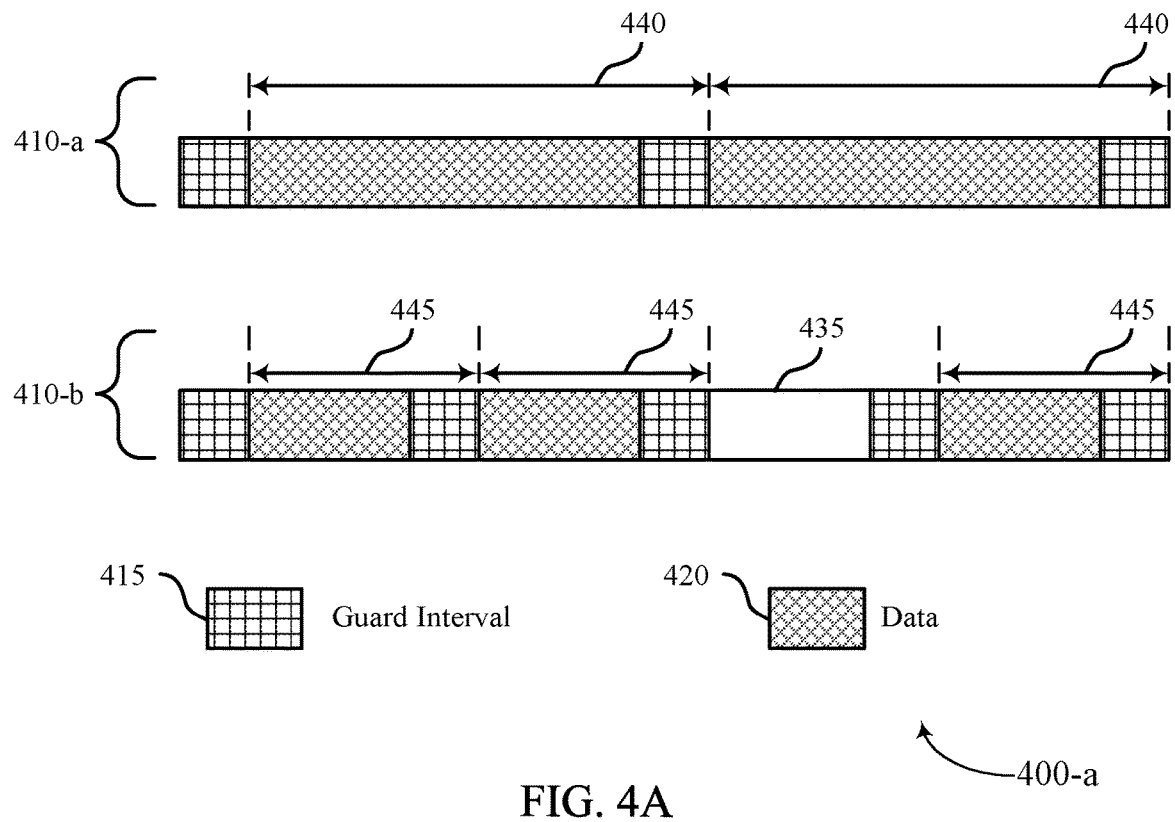
FIGS. 4A and 4B illustrate examples of communication timelines that support dynamic slot format configuration in accordance with aspects of the present disclosure.
Figure 4B:
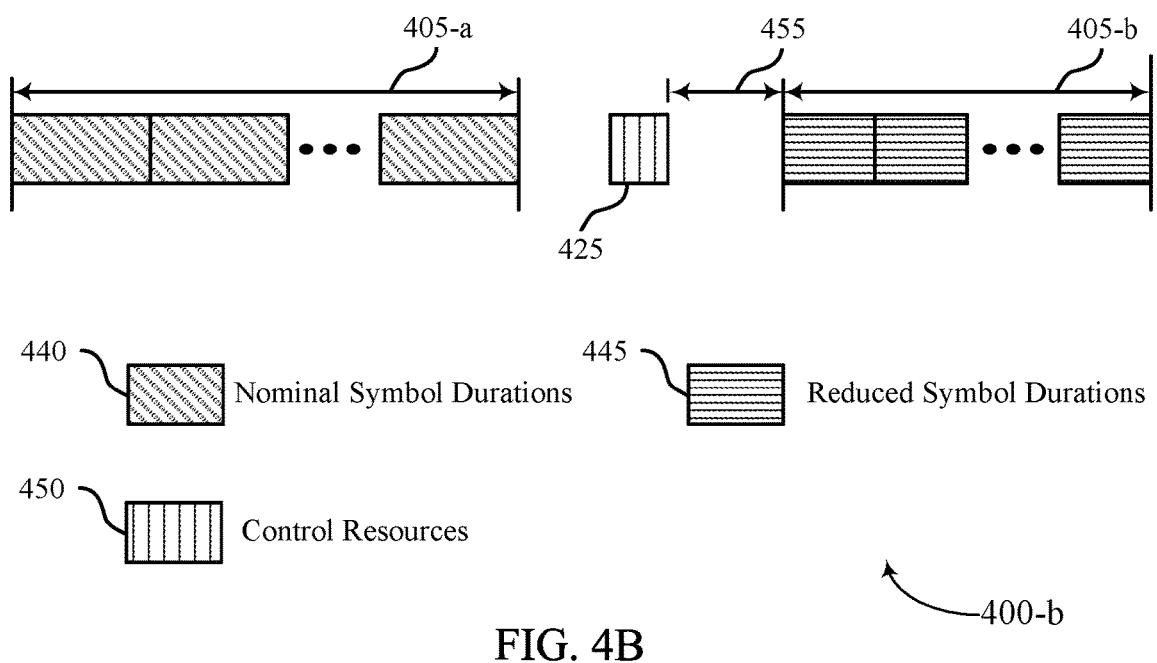

FIGS. 4A and 4B illustrate examples of communication timelines 400-a and 400-b that support dynamic slot format configuration in accordance with aspects of the present disclosure. The communication timelines 400-a and 400-b illustrate example communications between a UE 115 and a base station 105 according to different slot formats 410. The UE 115 and the base station 105 may be examples of a UE 115 and a base station 105 as described with reference to FIGS. 1 through 3. In some examples, the UE 115 and the base station 105 may switch between communications according to a first slot format 410-a that includes symbols having nominal symbol durations 440 and a second slot format 410-b that includes symbols having symbol durations 445 that are shorter than the nominal symbol durations 440.

The base station 105 may transmit control signaling to indicate a switch between slot formats 410, as described with reference to FIGS. 2 and 3. In some examples, the indication of the switch between slot formats may indicate a change of a symbol size or duration within a slot. That is, the base station 105 and the UE 115 may switch between communicating according to a first symbol duration 440 in a first set of one or more slots to communicating according to a second symbol duration 445 in a second set of one or more slots. The second symbol duration 445 may be greater than or less than the first symbol duration 440. The base station 105 and the UE 115 may switch between symbol durations to support low latency traffic, to reduce UE complexity, to support beam switching, to support reference signal transmissions, or any combination thereof.

In some examples, the UE 115 and the base station 105 may support URLLC. The URLLC traffic may include delay sensitive data traffic and relatively small payload sizes. As such, relatively short symbol sizes may provide for the UE 115 and the base station 105 to communicate the short data bursts relatively quickly (e.g., to satisfy a URLLC latency threshold). That is, the UE 115 and the base station 105 may TDM a physical downlink shared channel (PDSCH) signal and a physical downlink control channel (PDCCH) signal in relatively short succession. To support URLLC data traffic, the base station 105 may transmit control signaling to the UE 115 to indicate the slot format 410-b, or some other slot format 410, that supports the reduced symbol durations 445.

In some other examples, an SCS for communications between the UE 115 and the base station 105 may be relatively large, which may provide for a reduced symbol time (e.g., and a reduced slot duration). The reduced symbols may provide for a receiver to perform more DFT operations within a given time period than if the SCS is lower, which may increase UE complexity. In some such cases, the UE 115 (e.g., or another receiving device) may perform single tap FDE operations, or other efficient DFT techniques. Accordingly, at relatively high operating frequency bands, a UE 115 may support varying processing loads and increased UE complexity (e.g., due to scheduling activity, MIMO layers, beam management, radio frequency (RF) parameters, or the like). To adapt to changing UE complexity, the base station 105 as described herein may transmit the control signaling to dynamically switch between slot formats 410 that support varying symbol durations.

In yet some other examples, the UE 115, the base station 105, or both may perform beam switching during communications. A reduced symbol duration may provide time for the beam switching operation within a slot. Additionally or alternatively, the UE 115 or the base station 105 may transmit an extra reference signal, such as a phase tracking reference signal (PTRS) or synchronization reference signal. A reduced symbol duration may provide time for transmission of the extra reference signal. Accordingly, the base station 105 may configure a slot format 410 having different symbol durations based on beam switching or reference signal transmissions.

FIG. 4A illustrates an example communication timeline 400-*a*. The communication timeline 400-*a* illustrates a portion of a first slot format 410-*a* and a second slot format 410-*b*. The first and second slot formats 410 illustrate a subset of symbols and guard intervals 415 within a portion of a slot. The slot formats 410 may be guard interval-based slot formats 410 including the guard intervals 415, or cyclic prefix-based slot formats 410 that include cyclic prefixes (not pictured in FIG. 4A). That is, the slot formats 410 may be examples of any of the slot formats 300 described with reference to FIG. 3. The slot formats 410 may additionally or alternatively correspond to different symbol durations. The base station 105 may transmit control signaling to the UE 115 to indicate a configuration for the slot formats 410, which may indicate a respective symbol duration for the slot formats 410.

In the example of FIG. 4A, a first slot format configuration may indicate a first symbol duration 440 for the first slot format 410-*a* and a second slot format configuration may indicate a second symbol duration 445 for the second slot format 410-*b*. In some examples, the first symbol duration 440 may be a nominal or default symbol duration. For example, the UE 115 and the base station may be configured to communicate according to the nominal symbol duration 440 (e.g., a pre-defined symbol duration 440, such as for a specific frequency band). As described herein, the base station 105 may indicate a symbol duration 445 that is different than the nominal symbol duration 440 to be used for communications in one or more slots. The base station 105 may indicate the different symbol duration 445 based on one or more communication parameters, as described herein. The indicated symbol duration 445 may, in some examples, include a different quantity of samples than the nominal symbol duration 440.

The slot format 410-*b* may be configured to support the reduced symbol duration 445 that is less than the nominal symbol duration 440, which may support an increased quantity of symbols in a slot. That is, as the symbol duration 445 is decreased from the nominal symbol duration 440, the quantity of symbols in the slot may increase. Although not pictured in FIG. 4A, the symbol duration 445 may alternatively be greater than the nominal symbol duration 440, and the quantity of symbols in the slot may decrease. In some examples, the symbol duration 445 may increase or decrease by an integer factor of the nominal symbol duration 440 (e.g., two times smaller, or some other integer factor) to ensure alignment between symbols and slots. In some examples, the duration of the slot may change if a symbol duration 445 changes from the nominal symbol duration 440, such that a quantity of symbols in each slot remains the same. That is, a duration of the slot format 410-*a* may be less than a duration of the slot format 410-*b*, and a quantity of symbols in each slot may be the same.

The reduced symbol duration 445 may support resources that may be allocated for alternative uses in a slot. As such, a slot that is configured according to the slot format 410-*b* to include symbols having the reduced symbol duration 445 may include an additional period 435. The base station 105 may indicate a location and contents of the additional period 435 to the UE 115 via the configuration for the slot format 410-*b*, or via other control signaling. The additional period 435 may be used for transmission of data 420, one or more reference signals, or both. Additionally or alternatively, the additional period 435 may be a gap period that may include null resources (e.g., empty resources). The UE 115 and the base station 105 may use the gap period for beam switching, uplink and downlink switching, or some other process involving a non-negligible latency.

Accordingly, a slot format 410-*b* may be configured to support a symbol duration 445 that is different from a nominal symbol duration 440. The slot formats 410-*a* and 410-*b* may be configured for communications according to a same SCS and in a same frequency band.

FIG. 4B illustrates an example communication timeline 400-*b* that includes a switch between the first slot format 410-*a* and the second slot format 410-*b*. In the example of the communication timeline 400-*b*, the UE 115 and the base station 105 may communicate in a first slot 405-*a* configured according to the slot format 410-*a*, and the UE 115 and the base station 105 may switch to communications in a second slot 405-*b* configured according to the slot format 410-*b*. The UE 115 and the base station 105 may perform the switch after a time period 455.

The base station 105 may transmit control signaling 425, such as DCI signaling, RRC signaling, a MAC-CE, or some other control signaling 425, via the control resources 450. The control signaling 425 may include a configuration message that indicates the second slot format 410-*b* and the reduced symbol duration 445. For example, the UE 115 may be configured with a set of supported symbol durations corresponding to different bit values, and the control signaling 425 may include a field indicating a bit value that corresponds to a selected symbol duration for communications. Alternatively, the control signaling 425 may include a field explicitly indicating the symbol duration value for communications. The UE 115 may receive the control signaling 425 and determine to switch to communicating according to the reduced symbol durations 445 in the slot 405-*b*. The UE 115 and the base station 105 may apply the switch after the time period 455, which may be indicated to the UE 115 via the control signaling 425, may be based on a UE capability, or both.

In some examples, if the UE 115 does not properly receive or decode the control signaling 425, the UE 115 and the base station 105 may fall back to nominal symbol duration 440 (e.g., a default symbol size). That is, if the UE 115 does not receive the control signaling 425, the UE 115 may identify a channel metric failing to satisfy a threshold during communications in the slot 405-*b*. The UE 115 and the base station 105 may fall back to the nominal symbol duration 440 after a time period based on the channel metric failing to satisfy the threshold. The UE 115 and the base station 105 may thereby communicate according to the slot format 410-a and the nominal symbol duration 440 during a portion of the slot 405-b, one or more other subsequent slots 405, or both (e.g., until the UE 115 successfully receives and decodes the control signaling 425 indicating the switch to the reduced symbol durations 445).

A base station 105 may thereby transmit control signaling 425 to indicate a switch between symbol durations during communications on a same frequency band and according to a same SCS. By switching slot formats 410 and corresponding symbol durations, the UE 115 and the base station 105 may support low latency communications, reduced UE complexity, beam switching, transmission of extra reference signals, or any combination thereof.

Figure 5:
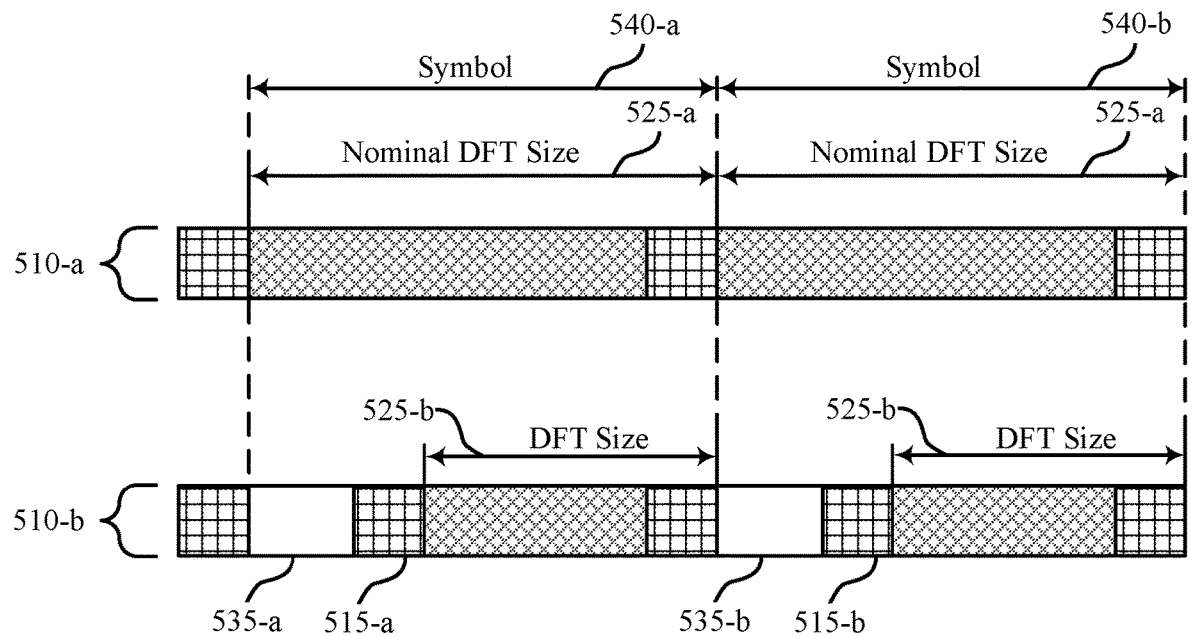
FIG. 5 illustrates an example of a discrete Fourier transform (DFT) window configuration that supports dynamic slot format configuration in accordance with aspects of the present disclosure.

FIG. 5 illustrates an example of a DFT window configuration 500 that supports dynamic slot format configuration in accordance with aspects of the present disclosure. The DFT window configuration 500 illustrates example configurations of slot formats 510-a and 510-b that correspond to different configurations of DFT window sizes 525. The slot formats 510-a and 510-b may represent examples of the slot formats as described with reference to FIGS. 2 and 3. In some examples, a UE 115 and a base station 105 may switch between communications according to the first slot format 510-a that corresponds to a nominal DFT window size 525-a and a second slot format 510-b that corresponds to a different DFT window size 525-b.

The base station 105 may transmit control signaling to indicate a switch between slot formats 510, as described with reference to FIGS. 2 through 4. In some examples, the indication of the switch between slot formats 510 may indicate a change of a DFT window size 525 within a slot. That is, the base station 105 and the UE 115 may switch between a first DFT window size 525 in each symbol 540 of a first set of one or more slots to a second DFT window size 525 in each symbol 540 of a second set of one or more slots. The second DFT window size 525 may be greater than or less than the first DFT window size 525. The base station 105 and the UE 115 may switch between DFT window sizes 525 to support low latency traffic, to reduce UE complexity, to support beam switching, to support reference signal transmissions, or any combination thereof.

As described with reference to FIG. 3, the base station 105 and the UE 115 may support URLLC communications, reduced UE complexity, beam switching, transmission of extra reference signals, or any combination thereof. The base station 105 may transmit control signaling to indicate a configuration for a slot format 510 corresponding to a nominal DFT window size 525-a or a reduced DFT window size 525-b to support such communications. The slot formats 510-a and 510-b may each correspond to a nominal symbol duration for each symbol 540 in the slot. That is, in the example of FIG. 5, the base station 105 may configure different DFT window sizes 525 for a slot to reduce UE complexity and support different types of communications.

Although the slot formats 510-a and 510-b are illustrated as guard interval-based slot formats 510 including the guard intervals 515, it is to be understood that the slot formats 510-a and 510-b may be any type of guard interval-based slot formats 510 or cyclic prefix-based slot formats 510. In other words, the slot formats 510-a and 510-b may be configured according to any of the example slot formats described with reference to FIG. 3. As described in further detail herein, the base station 105 may signal a configuration for the slot formats 510-a and 510-b to indicate whether a respective slot is a guard interval-based slot or a cyclic prefix-based slot and to additionally or alternatively adapt a DFT window size 525 at the UE 115.

The slot format 510-a may support a nominal DFT window size 525-a. In some examples, the nominal DFT window size 525-a may include a duration that is the same as a duration of each symbol 540 in the slot. Each symbol 540 in a slot configured according to the slot format 510-a may include data 520 and a corresponding guard interval 515 or cyclic prefix (not pictured in FIG. 5).

The slot format 510-b may support a DFT window size 525-b that may be different from (e.g., greater than or less than) the nominal DFT window size 525-a. In the example of FIG. 5, the DFT window size 525-b is less than the nominal DFT window size 525-a. The reduced DFT window size 525-b may include data 520 and a corresponding guard interval 515 or cyclic prefix. To support the reduced DFT window size 525-b while maintaining a same symbol duration (e.g., to ensure alignment between symbols 540 and slots), each symbol 540 in the slot may be configured to include an extra guard interval 515 or cyclic prefix, an additional period 535, or both.

To provide for an extra guard interval 515 (e.g., the guard intervals 515-a and 515-b) prior to the DFT window in a slot, the DFT window size 525-b may be less than the nominal DFT window size 525-b by a duration that is greater than or equal to a duration of a guard interval 515. The extra guard intervals 515-a and 515-b may maintain a circular convolution for the reduced DFT window size 525-b. For example, the symbol 540-a may include the extra guard interval 515-a prior to the data 520 and the symbol 540-b may include the extra guard interval 515-b prior to the data 520 to support a circular convolution.

In some examples, the symbol 540-a may additionally or alternatively include the additional period 535-a, and the symbol 540-b may include the additional period 535-b. The additional periods 535 may be allocated for transmission of a reference signal, time and frequency synchronization, or both. Additionally or alternatively, the additional periods 535 may include null resources and may be allocated as gap periods for beam switching, other switching periods, for micro-sleep to conserve power, or any combination thereof.

If a reference signal or other data is transmitted via one or both of the additional periods 535-a and 535-b, the UE 115 may use a DFT window for processing the reference signals. The additional periods 535 and reference signal transmissions may, in some examples, be configured such that a DFT window size 525 may be selected from a set of DFT window sizes 525 having relatively common DFT configuration lengths (e.g., lengths such as $2^i$, $3^j$, $5^k$, or the like).

The base station 105 may thereby transmit control signaling to the UE 115 to indicate a slot format 510 and a corresponding DFT window size 525 configured for the slot. The control signaling may indicate the DFT window size 525 (e.g., a length of the DFT), an indication of how to use a remaining portion of each symbol 540, or both. In some examples, the control signaling may indicate a configuration for a slot, and the configured DFT window size 525 may apply to each symbol 540 in the slot. Additionally or alternatively, the control signaling may indicate a configured change in DFT window sizes 525 for a subset of one or more symbols in a slot. The dynamic switching between DFT window sizes 525 may provide for reduced latency, UE complexity, and support for one or more different communication applications.

Figure 6:
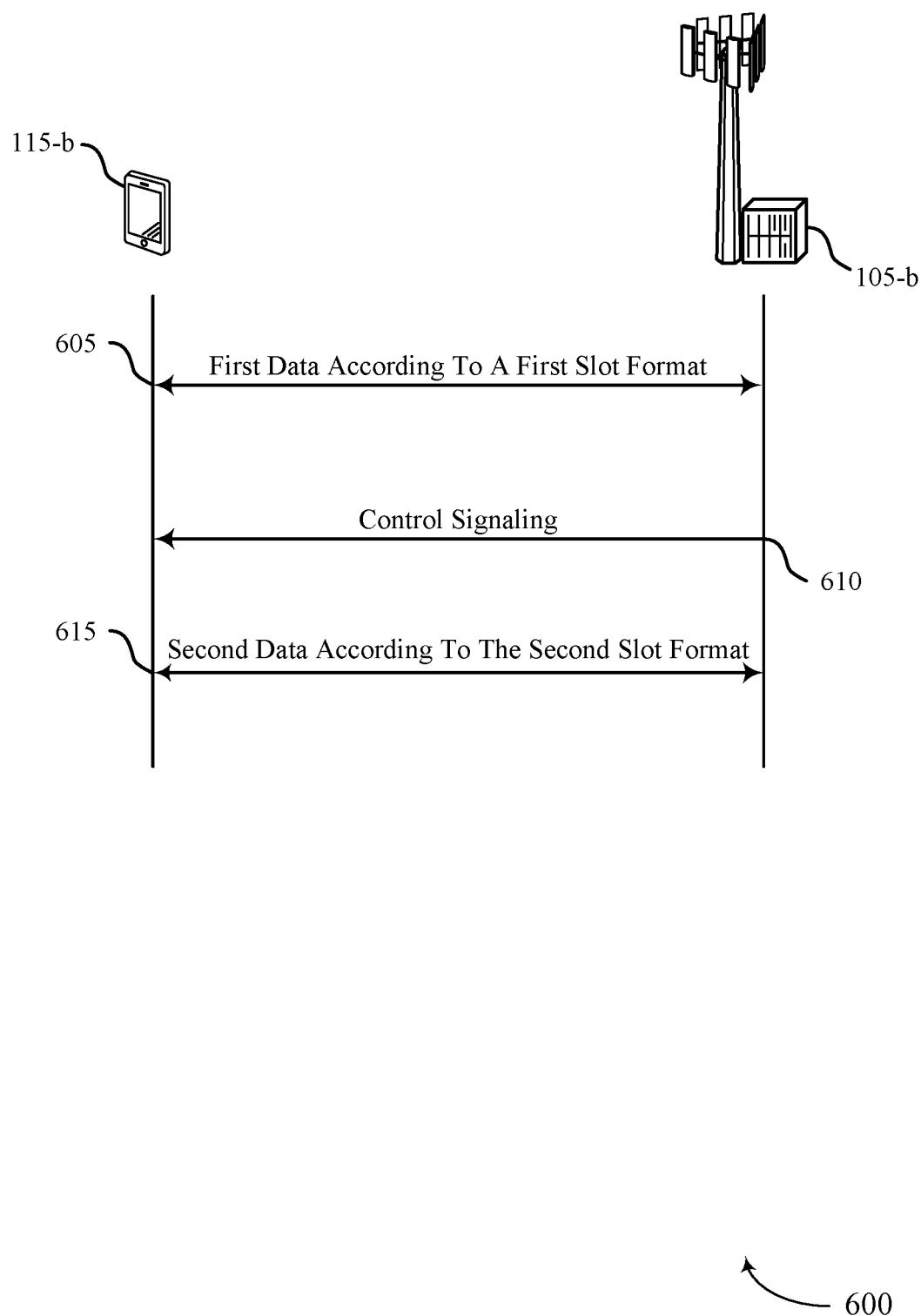
FIG. 6 illustrates an example of a process flow that supports dynamic slot format configuration in accordance with aspects of the present disclosure.

FIG. 6 illustrates an example of a process flow 600 that supports dynamic slot format configuration in accordance with aspects of the present disclosure. The process flow 600 may include various aspects of the present disclosure described with reference to FIGS. 1 through 5. For example, the process flow 600 may illustrate communications between a UE 115-*b* and a base station 105-*b*, which may be examples of corresponding devices as described with reference to FIGS. 1 through 5. In some examples, the base station 105-*b* may transmit a configuration for a slot format to the UE 115-*b* to support reduced latency, complexity, and improved communication reliability. Alternative examples of the following may be implemented, where some steps are performed in a different order than described or are not performed at all. In some cases, a step may include additional features not mentioned below, or further steps may be added.

At 605, the UE 115-*b* and the base station 105-*b* may communicate first data during a first slot in accordance with a first slot format. The first slot format may correspond to a first cyclic prefix-based or guard interval-based slot format. The data may be uplink data, downlink data, or both. In some examples, the first slot format may correspond to a first symbol duration, a first DFT window size, or both.

At 610, the base station 105-*b* may transmit control signaling to the UE 115-*b*. The control signaling may indicate a second slot format different from the first slot format. The second slot format may be a second cyclic prefix-based or guard interval-based slot format. In some examples, the second slot format may correspond to a second symbol duration, a second DFT window size, or both.

At 615, the UE 115-*b* and the base station 105-*b* may communicate second data during a second slot in accordance with the second slot format in response to receiving the control signaling. In some examples, the UE 115-*b* and the base station 105-*b* may begin communicating the second data a time period after receiving the control signaling. The time period may be indicated by the control signaling, may be based on a UE capability, or both. In some cases, the control signaling may indicate an applicability of the second slot format. For example, the second slot format may apply to one or more MIMO layers, TCI states, frequency sub-bands, UE antenna panels, or any combination thereof. In such cases, the second data may include data that is indicated as applicable to the second slot format.

Figure 7:
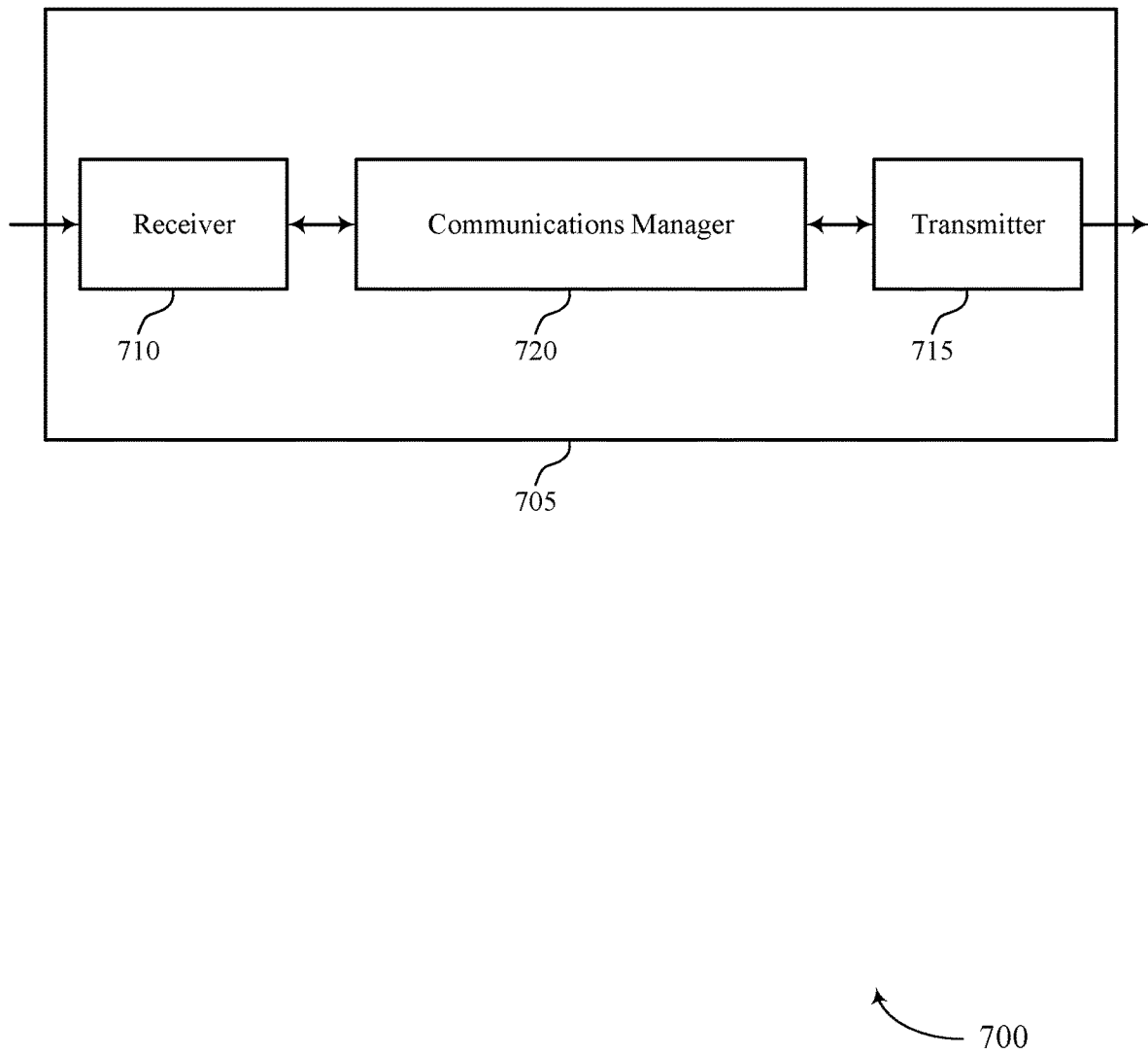
FIGS. 7 and 8 show block diagrams of devices that support dynamic slot format configuration in accordance with aspects of the present disclosure.

FIG. 7 shows a block diagram 700 of a device 705 that supports dynamic slot format configuration in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic slot format configuration). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic slot format configuration). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of dynamic slot format configuration as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for communicating first data during a first slot in accordance with a first slot format, the first slot format corresponding to a first cyclic prefix-based or guard interval-based slot format. The communications manager 720 may be configured as or otherwise support a means for receiving control signaling that indicates a second slot format different from the first slot format, the second slot format corresponding to a second cyclic prefix-based or guard interval-based slot format. The communications manager 720 may be configured as or otherwise support a means for communicating second data during a second slot in accordance with the second slot format in response to receiving the control signaling.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing overhead, reduced power consumption, and more efficient utilization of communication resources. By receiving control signaling indicating a switch between slot formats, the device 705 may dynamically support slot formats having different symbol durations, different DFT window sizes, or both. The symbol durations, DFT window sizes, or both may be configured based on one or more communication metrics, which may provide for reduced latency and reduced processing by the processor of the device 705. For example, a base station 105 may indicate a slot format having increased symbol durations to reduce UE complexity, which may reduce processing overhead and power consumption at the device 705. Additionally or alternatively, the control signaling may indicate an allocation of a signaling period within a slot for reference signal transmission or reception, beam switching, a gap period, or any combination thereof. By utilizing the extra resources, the processor may support reduced latency and more efficient utilization of communication resources.

Figure 8:
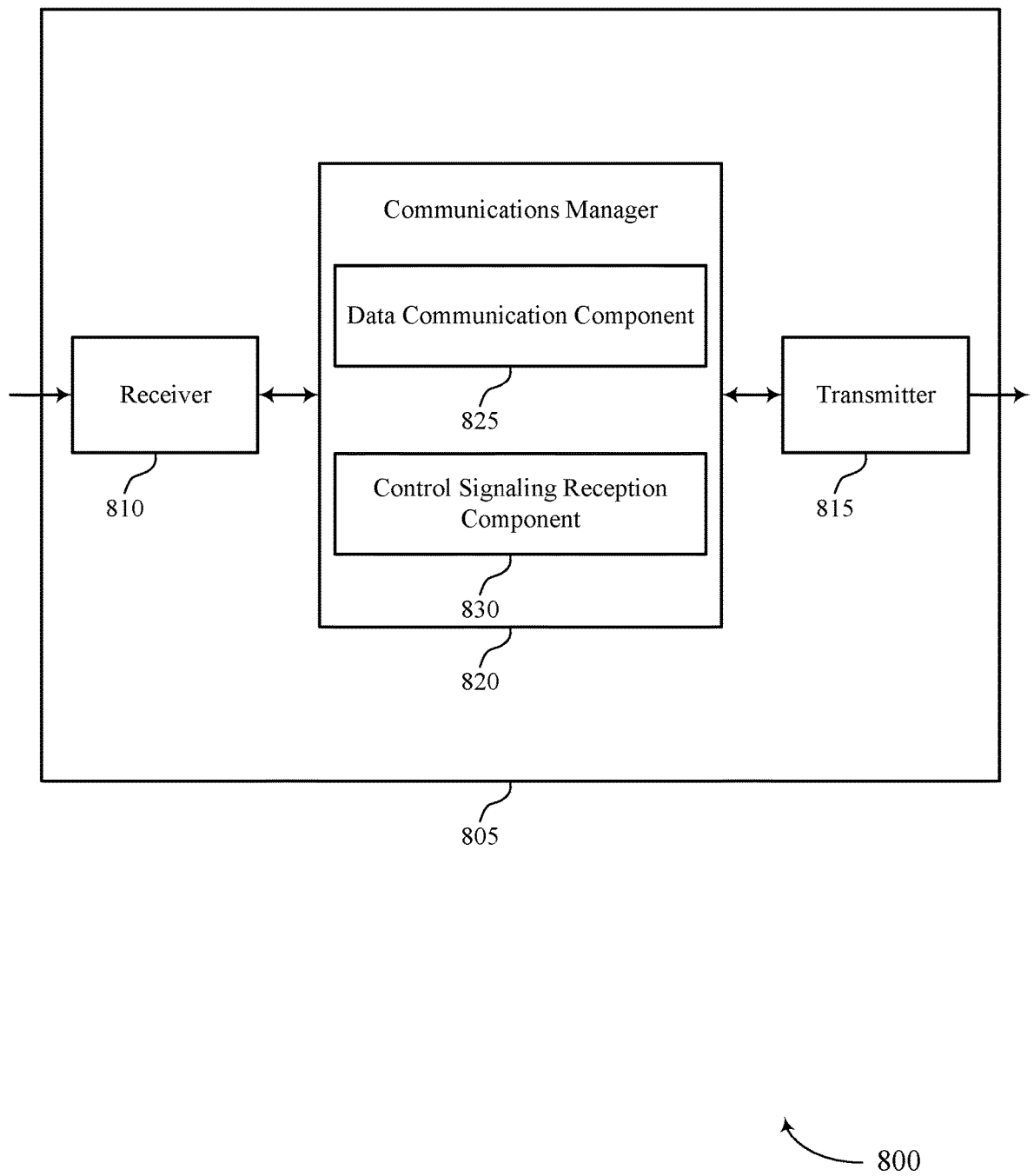

FIG. 8 shows a block diagram 800 of a device 805 that supports dynamic slot format configuration in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to dynamic slot format configuration). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to dynamic slot format configuration). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of dynamic slot format configuration as described herein. For example, the communications manager 820 may include a data communication component 825, a control signaling reception component 830, or both. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The data communication component 825 may be configured as or otherwise support a means for communicating first data during a first slot in accordance with a first slot format, the first slot format corresponding to a first cyclic prefix-based or guard interval-based slot format. The control signaling reception component 830 may be configured as or otherwise support a means for receiving control signaling that indicates a second slot format different from the first slot format, the second slot format corresponding to a second cyclic prefix-based or guard interval-based slot format. The data communication component 825 may be configured as or otherwise support a means for communicating second data during a second slot in accordance with the second slot format in response to receiving the control signaling.

Figure 9:
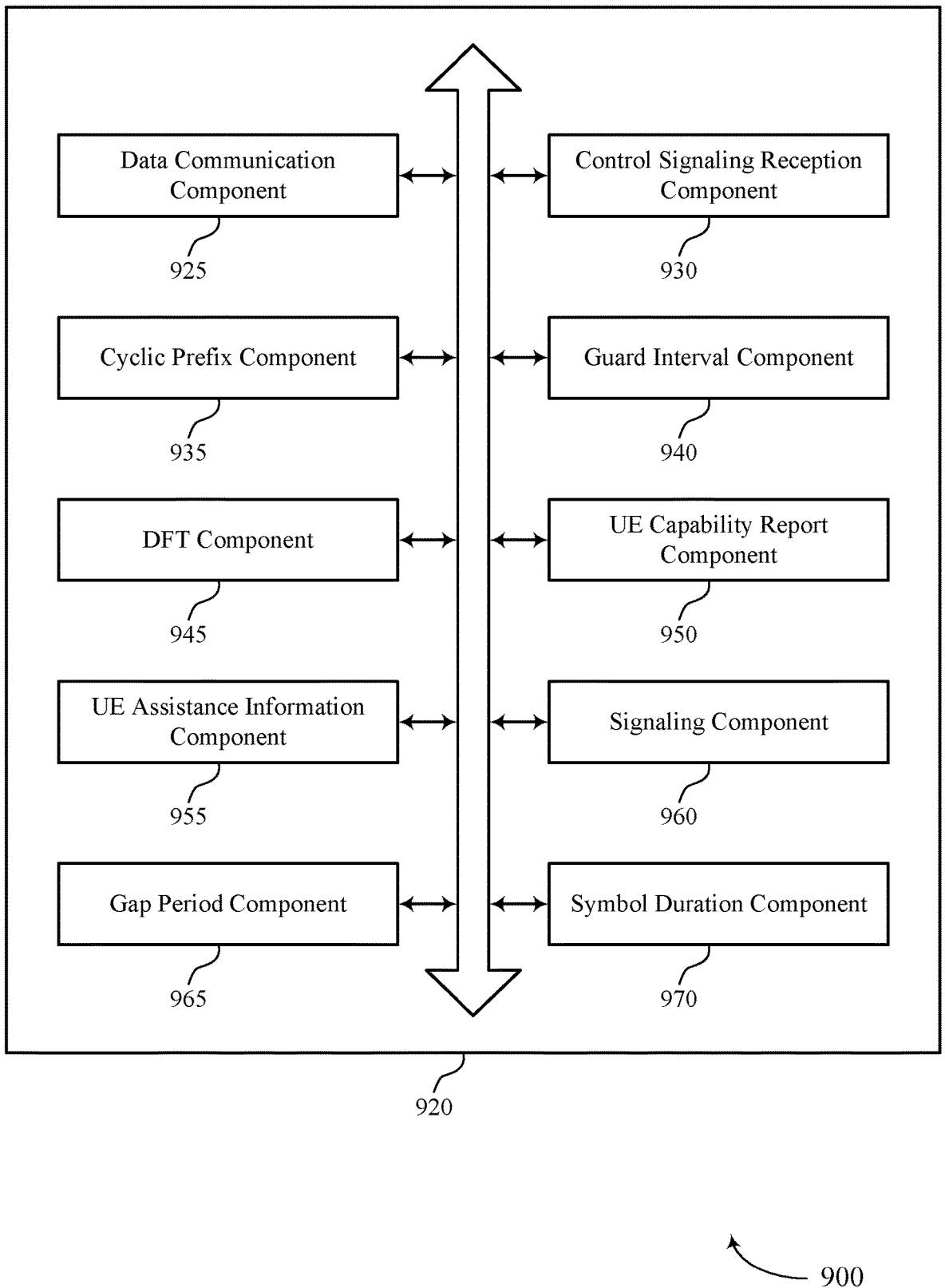
FIG. 9 shows a block diagram of a communications manager that supports dynamic slot format configuration in accordance with aspects of the present disclosure.

FIG. 9 shows a block diagram 900 of a communications manager 920 that supports dynamic slot format configuration in accordance with aspects of the present disclosure. The communications manager 920 may be an example of aspects of a communications manager 720, a communications manager 820, or both, as described herein. The communications manager 920, or various components thereof, may be an example of means for performing various aspects of dynamic slot format configuration as described herein. For example, the communications manager 920 may include a data communication component 925, a control signaling reception component 930, a cyclic prefix component 935, a guard interval component 940, a DFT component 945, a UE capability report component 950, a UE assistance information component 955, a signaling component 960, a gap period component 965, a symbol duration component 970, or any combination thereof. Each of these components may communicate, directly or indirectly, with one another (e.g., via one or more buses).

The communications manager 920 may support wireless communication at a UE in accordance with examples as disclosed herein. The data communication component 925 may be configured as or otherwise support a means for communicating first data during a first slot in accordance with a first slot format, the first slot format corresponding to a first cyclic prefix-based or guard interval-based slot format. The control signaling reception component 930 may be configured as or otherwise support a means for receiving control signaling that indicates a second slot format different from the first slot format, the second slot format corresponding to a second cyclic prefix-based or guard interval-based slot format. In some examples, the data communication component 925 may be configured as or otherwise support a means for communicating second data during a second slot in accordance with the second slot format in response to receiving the control signaling.

In some examples, the second slot format may indicate to communicate using the second slot as a cyclic prefix-based slot, and to support communicating the second data, the cyclic prefix component 935 may be configured as or otherwise support a means for communicating at least a portion of the second data and a corresponding cyclic prefix in one or more symbols of a set of multiple symbols of the second slot in accordance with the second slot format.

In some examples, the second slot format may indicate to communicate using the second slot as a non-slot contained guard interval-based slot, and to support communicating the second data, the guard interval component 940 may be configured as or otherwise support a means for communicating at least a portion of the second data and a corresponding guard interval in one or more symbols of a set of multiple symbols of the second slot in accordance with the second slot format, where a first guard interval corresponding to a first symbol of the set of multiple symbols is communicated in a slot that is prior to the second slot in time.

In some examples, the second slot format may indicate to communicate using the second slot as a slot contained guard interval-based slot, and to support communicating the second data, the guard interval component 940 may be configured as or otherwise support a means for communicating at least a first portion of the second data and a corresponding guard interval in one or more first symbols of a set of multiple symbols of the second slot in accordance with the second slot format.

In some examples, the second slot format may indicate a reduced symbol duration for one or more second symbols of the set of symbols of the second slot, and to support communicating the second data, the guard interval component 940 may be configured as or otherwise support a means for communicating at least a second portion of the second data and two or more guard intervals in the one or more second symbols having the reduced symbol duration in accordance with the second slot format, the second portion of the second data including fewer bits than the first portion of the second data based on the reduced symbol duration for the one or more second symbols.

In some examples, the second slot format may indicate a DFT window size for the second slot, and to support communicating the second data, the guard interval component 940 may be configured as or otherwise support a means for communicating at least the first portion of the second data and the corresponding guard interval in the one or more first symbols of the set of multiple symbols of the second slot in accordance with the DFT window size and the second slot format, where the DFT window size is different from a first DFT window size corresponding to the first slot format.

In some examples, the second slot format may indicate a signaling period having a first duration that is different from a second duration of each symbol of the set of symbols of the second slot, and to support communicating the second data, the signaling component 960 may be configured as or otherwise support a means for communicating a reference signal, at least a second portion of the second data, or any combination thereof during the signaling period, where the second slot format indicates a timing of the signaling period within the second slot.

In some examples, the second slot format may indicate a gap period having a first duration that is different from a second duration of each symbol of the set of symbols of the second slot, and to support communicating the second data, the gap period component 965 may be configured as or otherwise support a means for refraining from communicating during the gap period, where the second slot format indicates a timing of the gap period within the second slot.

In some examples, the second slot format may indicate a second symbol duration for each symbol in the second slot that is different from a first symbol duration corresponding to the first slot format, and to support communicating the second data, the data communication component 925 may be configured as or otherwise support a means for communicating at least a portion of the second data in one or more symbols of a set of multiple symbols of the second slot in accordance with the second symbol duration.

In some examples, a second slot duration of the second slot, a second quantity of symbols in the second slot, or both are different from a first slot duration of the first slot, a first quantity of symbols in the first slot, or both based on the second symbol duration being different from the first symbol duration.

In some examples, the first symbol duration corresponds to a nominal symbol duration, and the symbol duration component 970 may be configured as or otherwise support a means for falling back to the nominal symbol duration based on a channel metric failing to satisfy a threshold. In some examples, the first symbol duration corresponds to a nominal symbol duration, and the symbol duration component 970 may be configured as or otherwise support a means for communicating third data in a third slot in accordance with the nominal symbol duration based on falling back to the nominal symbol duration. In some examples, the second symbol duration is an integer factor of the first symbol duration.

In some examples, the second slot format may indicate a second DFT window size for the second slot that is different from a first DFT window size for the first slot, and to support communicating the second data, the DFT component 945 may be configured as or otherwise support a means for communicating at least a portion of the second data and a corresponding guard interval or cyclic prefix in one or more symbols of a set of multiple symbols of the second slot in accordance with the second DFT window size.

In some examples, the first DFT window size corresponds to a nominal DFT window size. In some examples, the second DFT window size is smaller than the nominal DFT window size by an amount that is greater than or equal to a duration of the corresponding guard interval or cyclic prefix.

In some examples, the DFT component 945 may be configured as or otherwise support a means for communicating two or more guard intervals, two or more cyclic prefixes, a reference signal, or any combination thereof in the one or more symbols of the set of multiple symbols of the second slot based on the amount by which the second DFT window size is smaller than the nominal DFT window size.

In some examples, the control signaling reception component 930 may be configured as or otherwise support a means for receiving first control signaling configuring a set of multiple slot formats including at least the first slot format and the second slot format, where the control signaling is second control signaling including an identifier indicating the second slot format from the set of multiple slot formats. In some examples, a slot format of the set of multiple slot formats indicates a location and contents of one or more symbols having reduced symbol durations in the second slot.

In some examples, the UE capability report component 950 may be configured as or otherwise support a means for transmitting a UE capability report, where the control signaling indicating the second slot format is received based on the UE capability report. In some examples, the UE assistance information component 955 may be configured as or otherwise support a means for transmitting a UE assistance information message requesting the second slot format, where the control signaling indicating the second slot format is received based on the UE assistance information message.

In some examples, the data communication component 925 may be configured as or otherwise support a means for applying the second slot format to the second slot a time period after receiving the control signaling, where the time period is indicated by the control signaling, is based on a UE capability, or both.

In some examples, the control signaling indicates an applicability of the second slot format. In some examples, the second slot format applies to one or more MIMO layers, one or more TCI states, one or more frequency sub-bands, one or more UE antenna panels, or any combination thereof based on the applicability of the second slot format.

In some examples, the first data and the second data are communicated in FR2.

Figure 10:
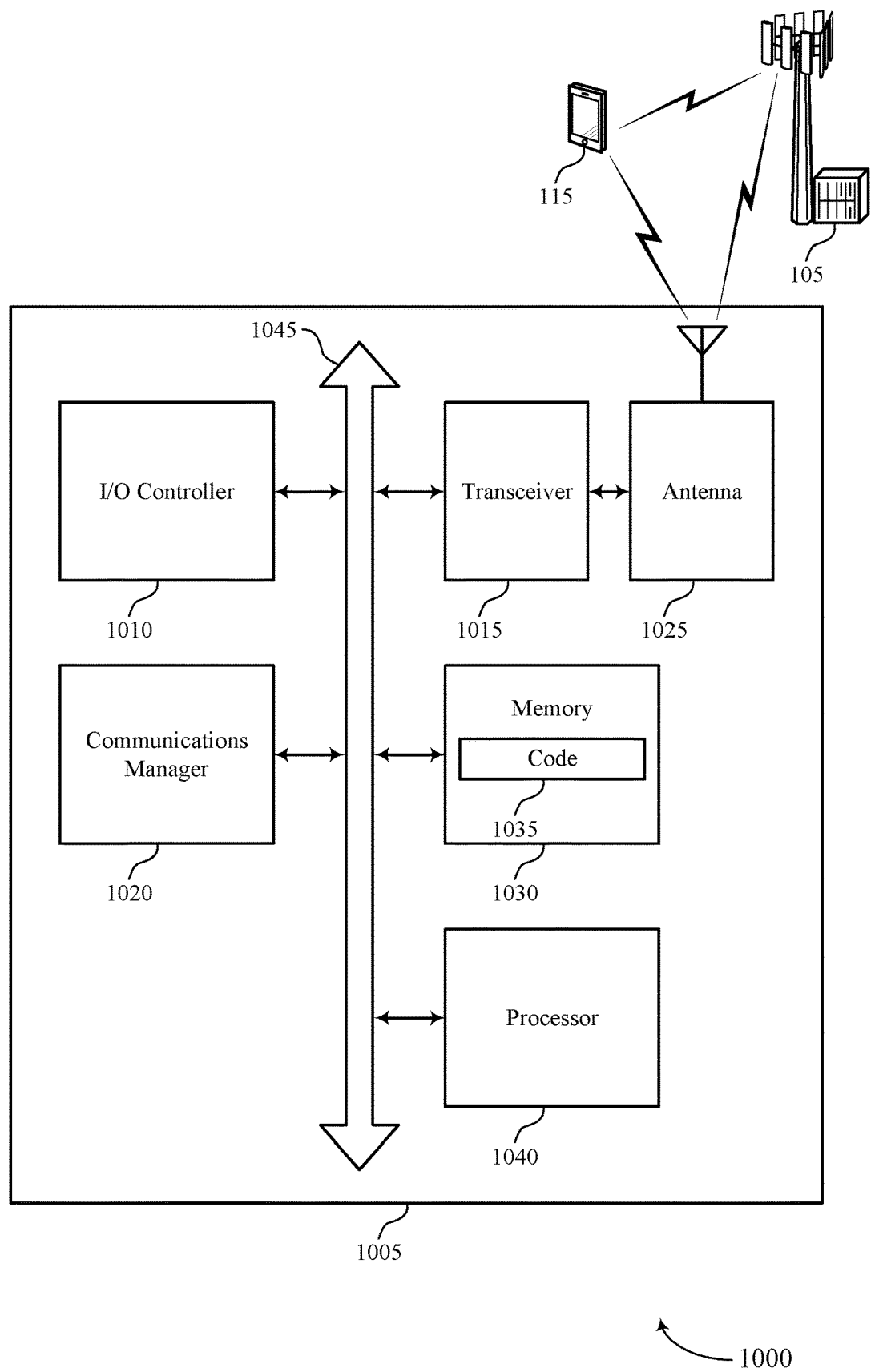
FIG. 10 shows a diagram of a system including a device that supports dynamic slot format configuration in accordance with aspects of the present disclosure.

FIG. 10 shows a diagram of a system 1000 including a device 1005 that supports dynamic slot format configuration in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting dynamic slot format configuration). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for communicating first data during a first slot in accordance with a first slot format, the first slot format corresponding to a first cyclic prefix-based or guard interval-based slot format. The communications manager 1020 may be configured as or otherwise support a means for receiving control signaling that indicates a second slot format different from the first slot format, the second slot format corresponding to a second cyclic prefix-based or guard interval-based slot format. The communications manager 1020 may be configured as or otherwise support a means for communicating second data during a second slot in accordance with the second slot format in response to receiving the control signaling.

By including or configuring the communications manager 1020 in accordance with examples as described herein, the device 1005 may support techniques for improved communication reliability, reduced latency, efficient utilization of communication resources, and improved coordination between devices. The device 1005 may receive control signaling indicating a switch between slot formats, which may provide for improved communication reliability and coordination between devices. Additionally or alternatively, the control signaling may indicate slot formats having different symbol durations, different DFT window sizes, or both. The symbol durations, DFT window sizes, or both may be configured based on one or more communication metrics, which may support reduced latency, reduced complexity at the device 1005, and improved communication reliability. Additionally or alternatively, the control signaling may indicate an allocation of a signaling period within a slot for reference signal transmission or reception, beam switching, a gap period, or any combination thereof. By utilizing the extra resources, the device 1005 may support reduced latency and more efficient utilization of communication resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of dynamic slot format configuration as described herein, or the processor 1040 and the memory 1030 may be otherwise configured to perform or support such operations.

Figure 11:
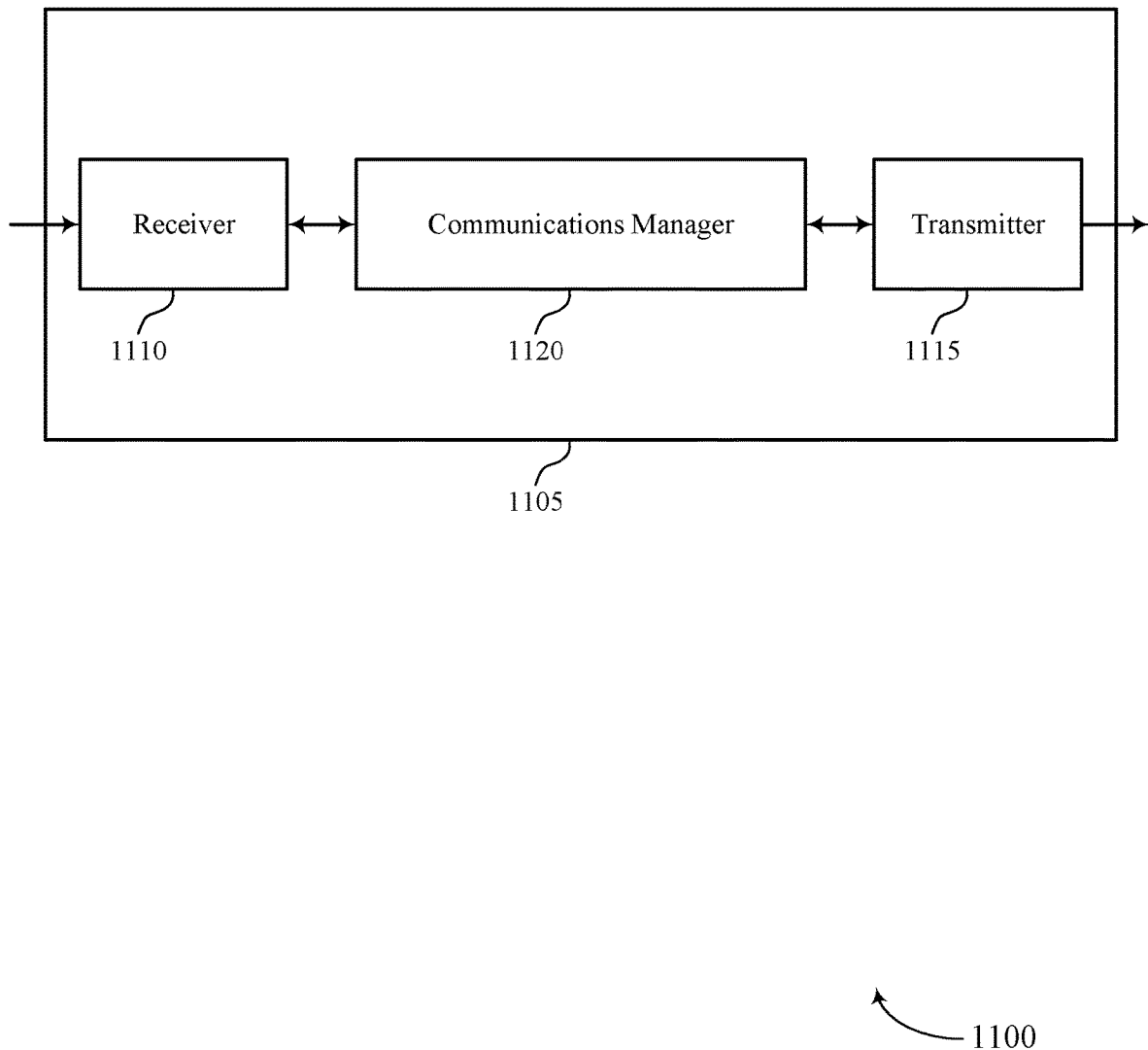
FIGS. 11 and 12 show block diagrams of devices that support dynamic slot format configuration in accordance with aspects of the present disclosure.

FIG. 11 shows a block diagram 1100 of a device 1105 that supports dynamic slot format configuration in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to dynamic slot format configuration). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to dynamic slot format configuration). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of dynamic slot format configuration as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for communicating, with a UE, first data during a first slot in accordance with a first slot format corresponding to a first cyclic prefix-based or guard interval-based slot format. The communications manager 1120 may be configured as or otherwise support a means for transmitting, to the UE, control signaling that indicates a second slot format different from the first slot format, the second slot format corresponding to a second cyclic prefix-based or guard interval-based slot format. The communications manager 1120 may be configured as or otherwise support a means for communicating, with the UE, second data during a second slot in accordance with the second slot format based on transmitting the control signaling.

Figure 12:
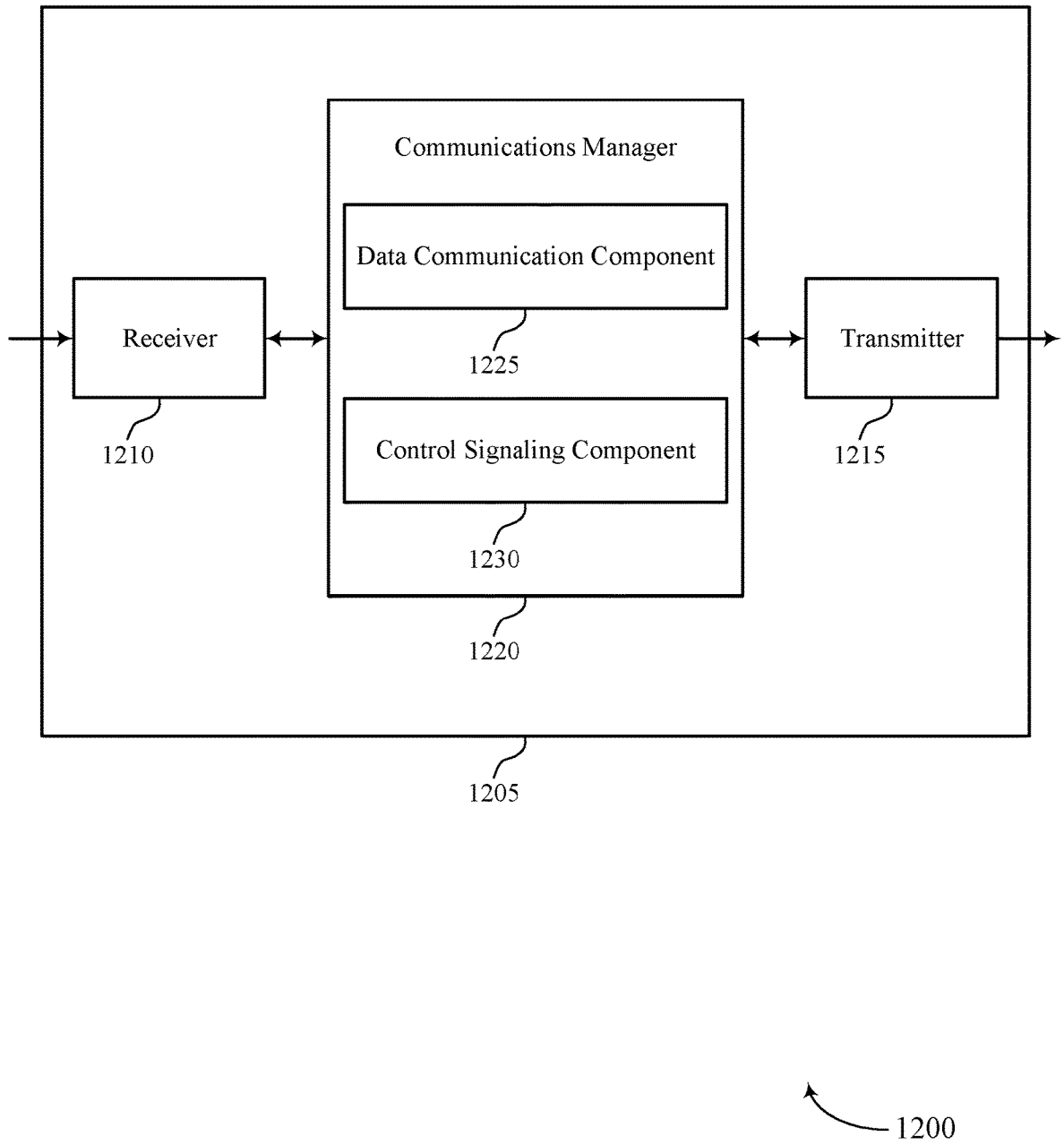

FIG. 12 shows a block diagram 1200 of a device 1205 that supports dynamic slot format configuration in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to dynamic slot format configuration). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to dynamic slot format configuration). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of dynamic slot format configuration as described herein. For example, the communications manager 1220 may include a data communication component 1225, a control signaling component 1230, or both. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The data communication component 1225 may be configured as or otherwise support a means for communicating, with a UE, first data during a first slot in accordance with a first slot format corresponding to a first cyclic prefix-based or guard interval-based slot format. The control signaling component 1230 may be configured as or otherwise support a means for transmitting, to the UE, control signaling that indicates a second slot format different from the first slot format, the second slot format corresponding to a second cyclic prefix-based or guard interval-based slot format. The data communication component 1225 may be configured as or otherwise support a means for communicating, with the UE, second data during a second slot in accordance with the second slot format based on transmitting the control signaling.

Figure 13:
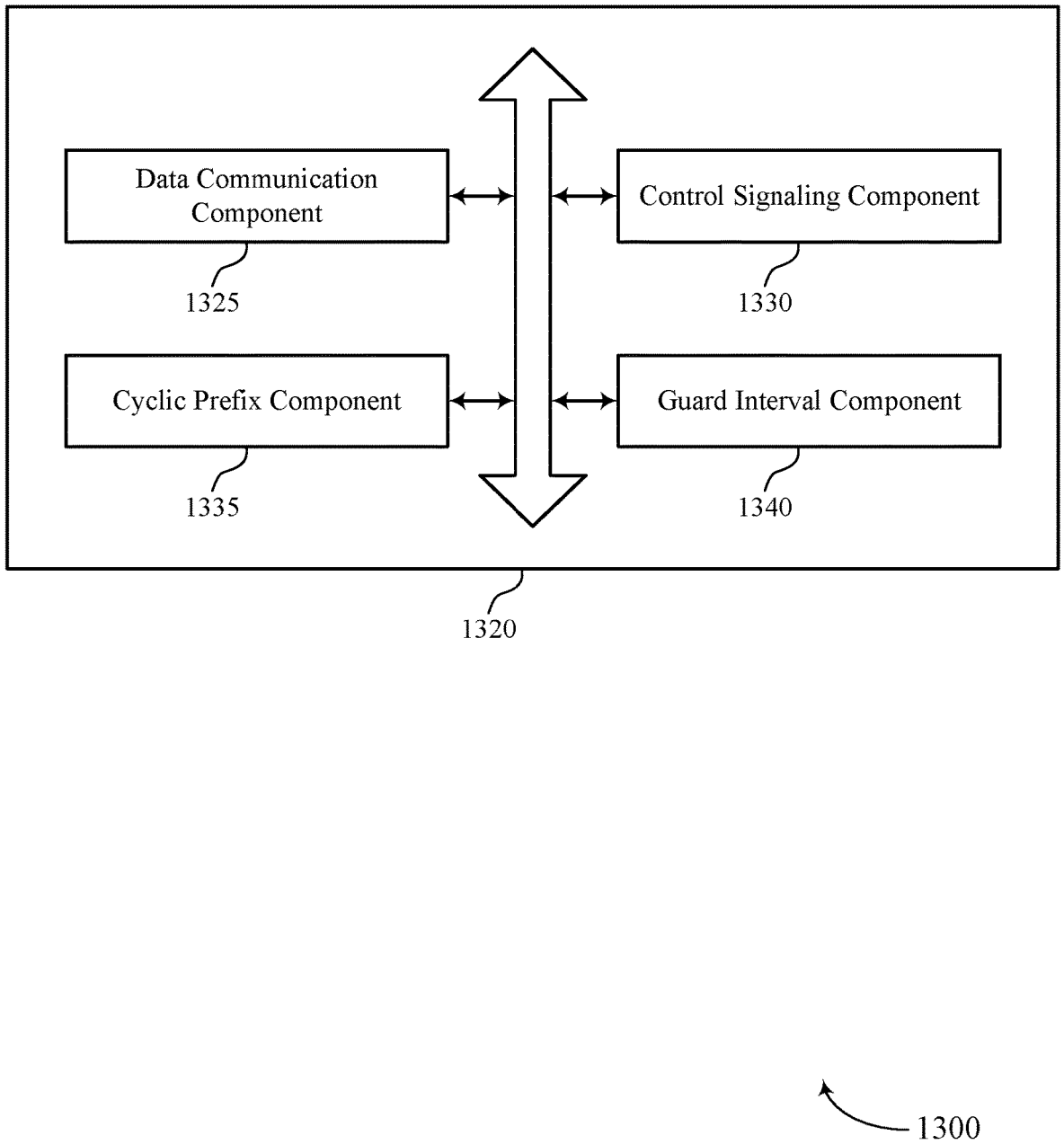
FIG. 13 shows a block diagram of a communications manager that supports dynamic slot format configuration in accordance with aspects of the present disclosure.

FIG. 13 shows a block diagram 1300 of a communications manager 1320 that supports dynamic slot format configuration in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of dynamic slot format configuration as described herein. For example, the communications manager 1320 may include a data communication component 1325, a control signaling component 1330, a cyclic prefix component 1335, a guard interval component 1340, or any combination thereof. Each of these components may communicate, directly or indirectly, with one another (e.g., via one or more buses).

The communications manager 1320 may support wireless communication at a base station in accordance with examples as disclosed herein. The data communication component 1325 may be configured as or otherwise support a means for communicating, with a UE, first data during a first slot in accordance with a first slot format corresponding to a first cyclic prefix-based or guard interval-based slot format. The control signaling component 1330 may be configured as or otherwise support a means for transmitting, to the UE, control signaling that indicates a second slot format different from the first slot format, the second slot format corresponding to a second cyclic prefix-based or guard interval-based slot format. In some examples, the data communication component 1325 may be configured as or otherwise support a means for communicating, with the UE, second data during a second slot in accordance with the second slot format based on transmitting the control signaling.

In some examples, the second slot format may indicate to communicate using the second slot as a cyclic prefix-based slot, and to support communicating the second data, the cyclic prefix component 1335 may be configured as or otherwise support a means for communicating at least a portion of the second data and a corresponding cyclic prefix in one or more symbols of a set of multiple symbols of the second slot in accordance with the second slot format.

In some examples, the second slot format may indicate to communicate using the second slot as a non-slot contained guard interval-based slot, and to support communicating the second data, the guard interval component 1340 may be configured as or otherwise support a means for communicating at least a portion of the second data and a corresponding guard interval in one or more symbols of a set of multiple symbols of the second slot in accordance with the second slot format, where a first guard interval corresponding to a first symbol of the set of multiple symbols is communicated in a slot that is prior to the second slot in time.

In some examples, the second slot format may indicate to communicate using the second slot as a slot contained guard interval-based slot, and to support communicating the second data, the guard interval component 1340 may be configured as or otherwise support a means for communicating at least a portion of the second data and a corresponding guard interval in one or more symbols of a set of multiple symbols of the second slot in accordance with the second slot format.

In some examples, the second slot format may indicate a second symbol duration for each symbol in the second slot that is different from a first symbol duration corresponding to the first slot format, and to support communicating the second data, the data communication component 1325 may be configured as or otherwise support a means for communicating at least a portion of the second data in one or more symbols of a set of multiple symbols of the second slot in accordance with the second symbol duration.

In some examples, the second slot format may indicate a second DFT window size for the second slot that is different from a first DFT window size for the first slot, and to support communicating the second data, the data communication component 1325 may be configured as or otherwise support a means for communicating at least a portion of the second data and a corresponding guard interval or cyclic prefix in one or more symbols of a set of multiple symbols of the second slot in accordance with the second DFT window size.

Figure 14:
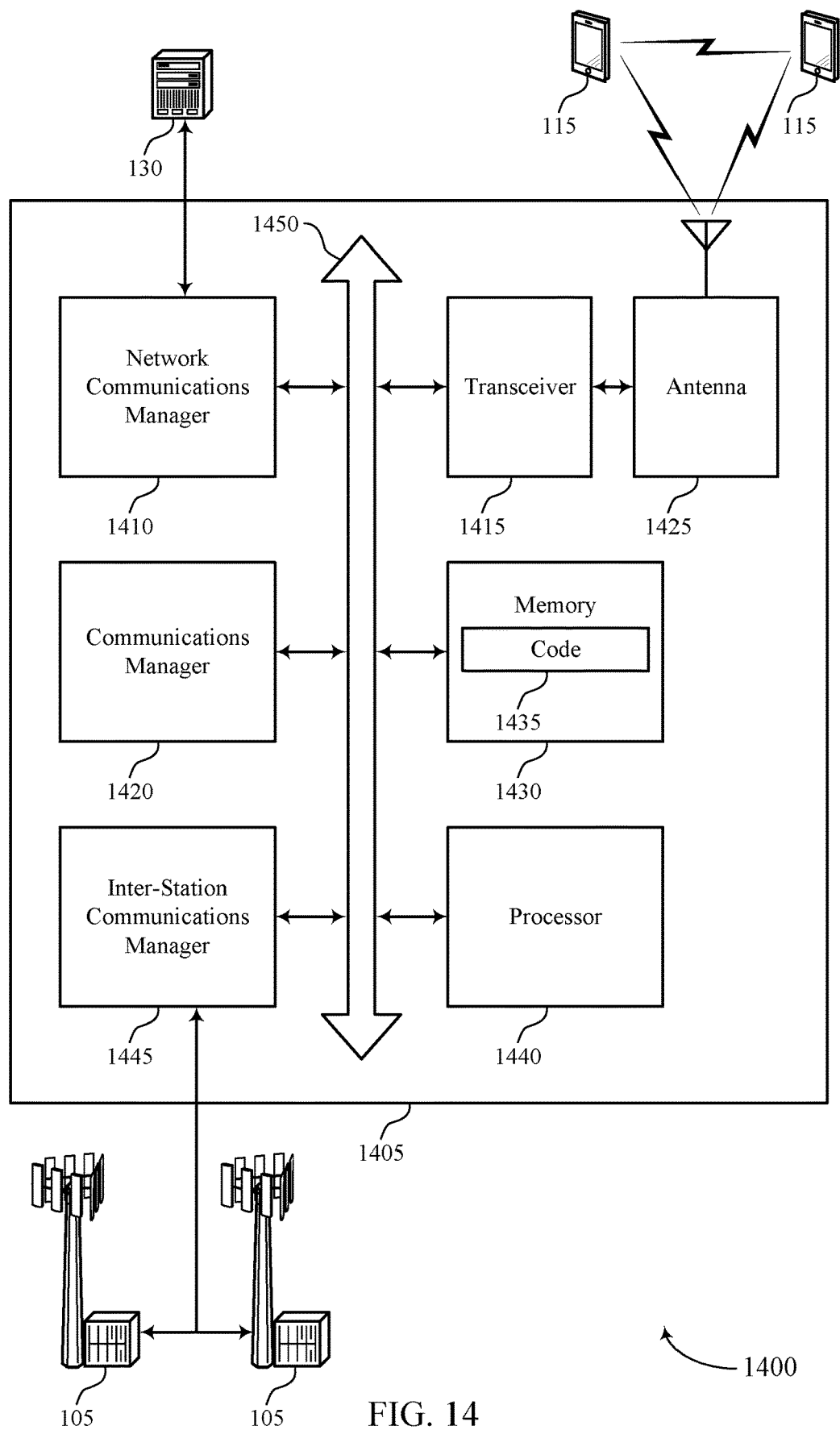
FIG. 14 shows a diagram of a system including a device that supports dynamic slot format configuration in accordance with aspects of the present disclosure.

FIG. 14 shows a diagram of a system 1400 including a device 1405 that supports dynamic slot format configuration in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting dynamic slot format configuration). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for communicating, with a UE, first data during a first slot in accordance with a first slot format corresponding to a first cyclic prefix-based or guard interval-based slot format. The communications manager 1420 may be configured as or otherwise support a means for transmitting, to the UE, control signaling that indicates a second slot format different from the first slot format, the second slot format corresponding to a second cyclic prefix-based or guard interval-based slot format. The communications manager 1420 may be configured as or otherwise support a means for communicating, with the UE, second data during a second slot in accordance with the second slot format based on transmitting the control signaling.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of dynamic slot format configuration as described herein, or the processor 1440 and the memory 1430 may be otherwise configured to perform or support such operations.

Figure 15:
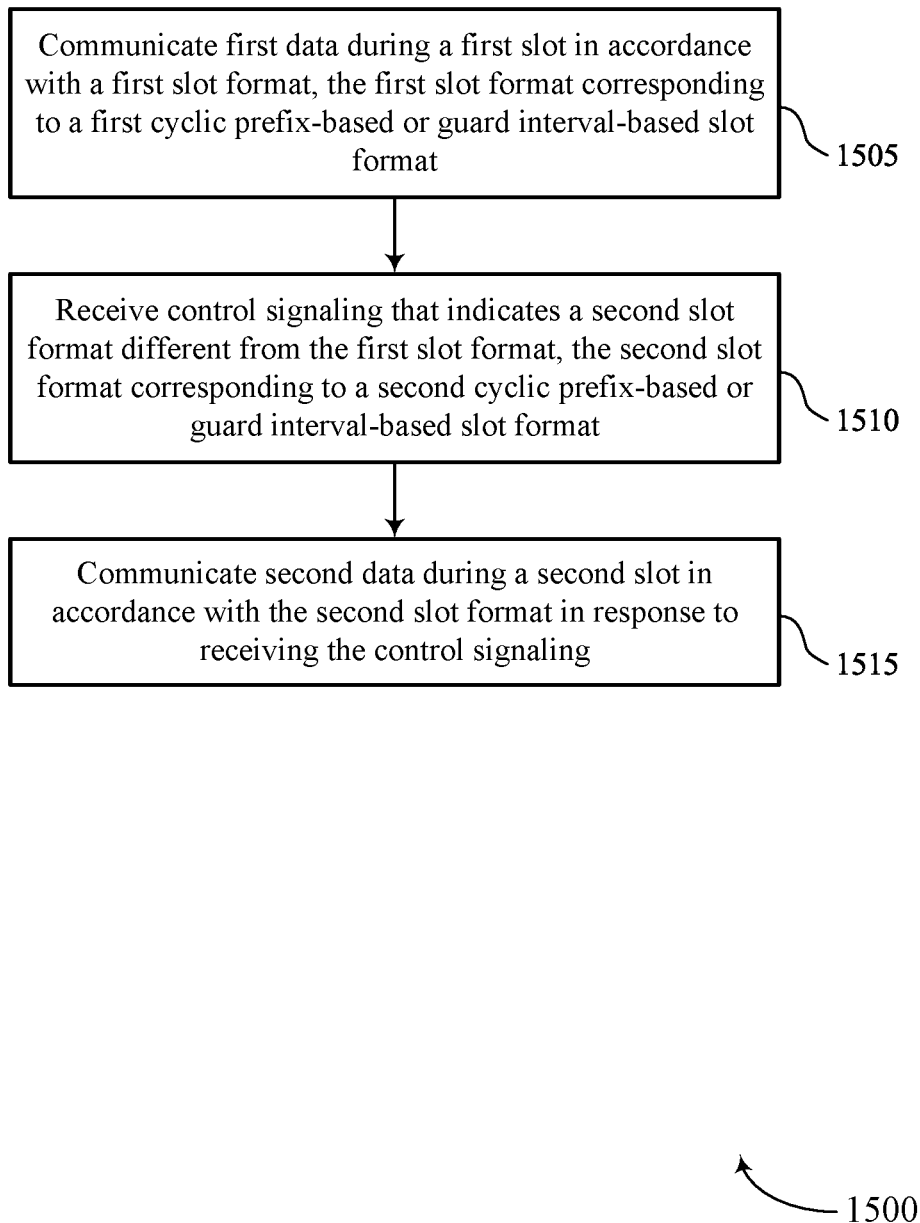
FIGS. 15 through 17 show flowcharts illustrating methods that support dynamic slot format configuration in accordance with aspects of the present disclosure.

FIG. 15 shows a flowchart illustrating a method 1500 that supports dynamic slot format configuration in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include communicating first data during a first slot in accordance with a first slot format, the first slot format corresponding to a first cyclic prefix-based or guard interval-based slot format. The operations of 1505 may be performed in accordance with examples as disclosed herein. In some examples, aspects of the operations of 1505 may be performed by a data communication component 925 as described with reference to FIG. 9.

At 1510, the method may include receiving control signaling that indicates a second slot format different from the first slot format, the second slot format corresponding to a second cyclic prefix-based or guard interval-based slot format. The operations of 1510 may be performed in accordance with examples as disclosed herein. In some examples, aspects of the operations of 1510 may be performed by a control signaling reception component 930 as described with reference to FIG. 9.

At 1515, the method may include communicating second data during a second slot in accordance with the second slot format in response to receiving the control signaling. The operations of 1515 may be performed in accordance with examples as disclosed herein. In some examples, aspects of the operations of 1515 may be performed by a data communication component 925 as described with reference to FIG. 9.

Figure 16:
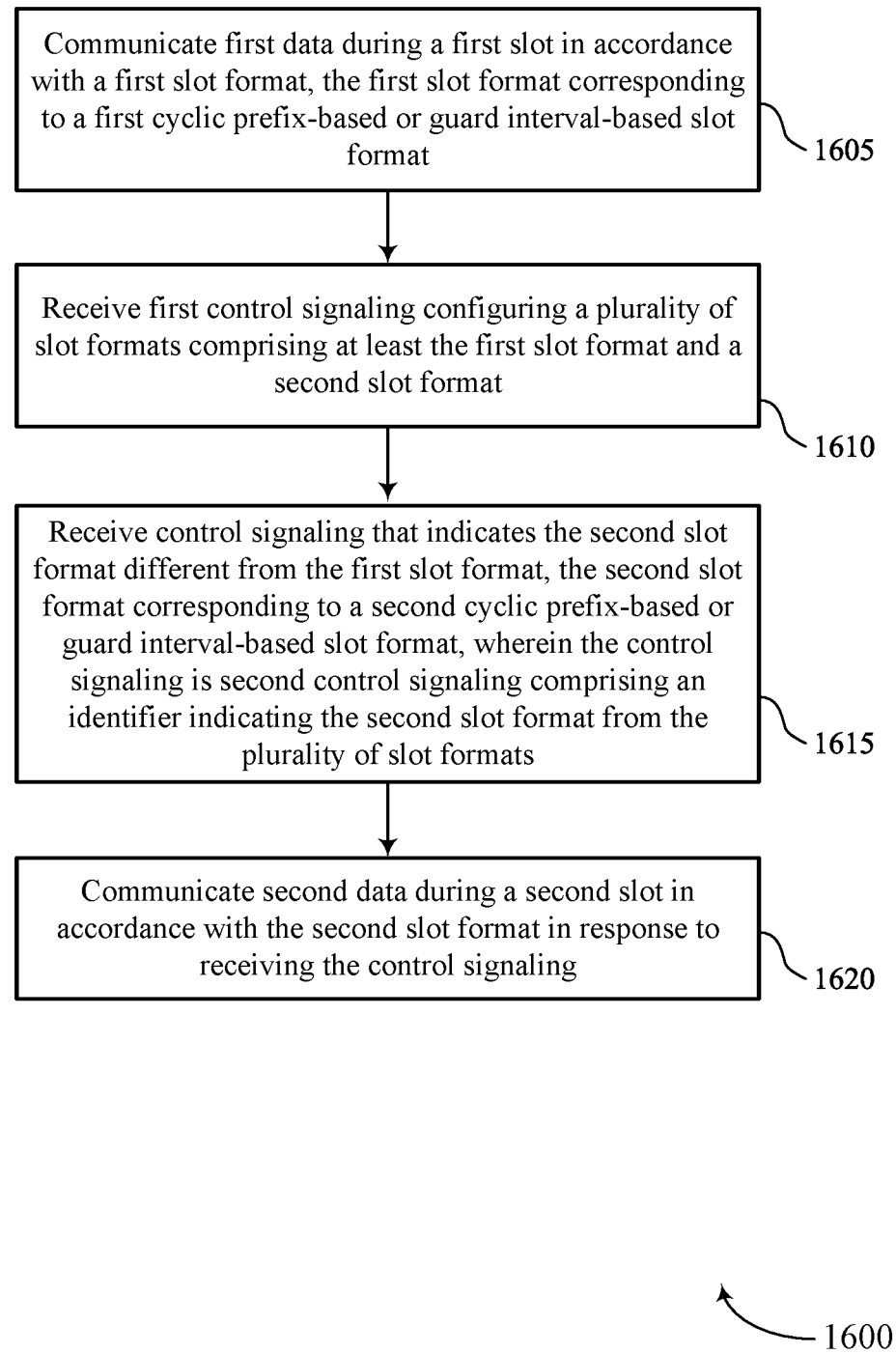

FIG. 16 shows a flowchart illustrating a method 1600 that supports dynamic slot format configuration in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include communicating first data during a first slot in accordance with a first slot format, the first slot format corresponding to a first cyclic prefix-based or guard interval-based slot format. The operations of 1605 may be performed in accordance with examples as disclosed herein. In some examples, aspects of the operations of 1605 may be performed by a data communication component 925 as described with reference to FIG. 9.

At 1610, the method may include receiving first control signaling configuring a set of multiple slot formats including at least the first slot format and a second slot format. The operations of 1610 may be performed in accordance with examples as disclosed herein. In some examples, aspects of the operations of 1610 may be performed by a control signaling reception component 930 as described with reference to FIG. 9.

At 1615, the method may include receiving control signaling that indicates the second slot format different from the first slot format, the second slot format corresponding to a second cyclic prefix-based or guard interval-based slot format, where the control signaling is second control signaling including an identifier indicating the second slot format from the set of multiple slot formats. The operations of 1615 may be performed in accordance with examples as disclosed herein. In some examples, aspects of the operations of 1615 may be performed by a control signaling reception component 930 as described with reference to FIG. 9.

At 1620, the method may include communicating second data during a second slot in accordance with the second slot format in response to receiving the control signaling. The operations of 1620 may be performed in accordance with examples as disclosed herein. In some examples, aspects of the operations of 1620 may be performed by a data communication component 925 as described with reference to FIG. 9.

Figure 17:
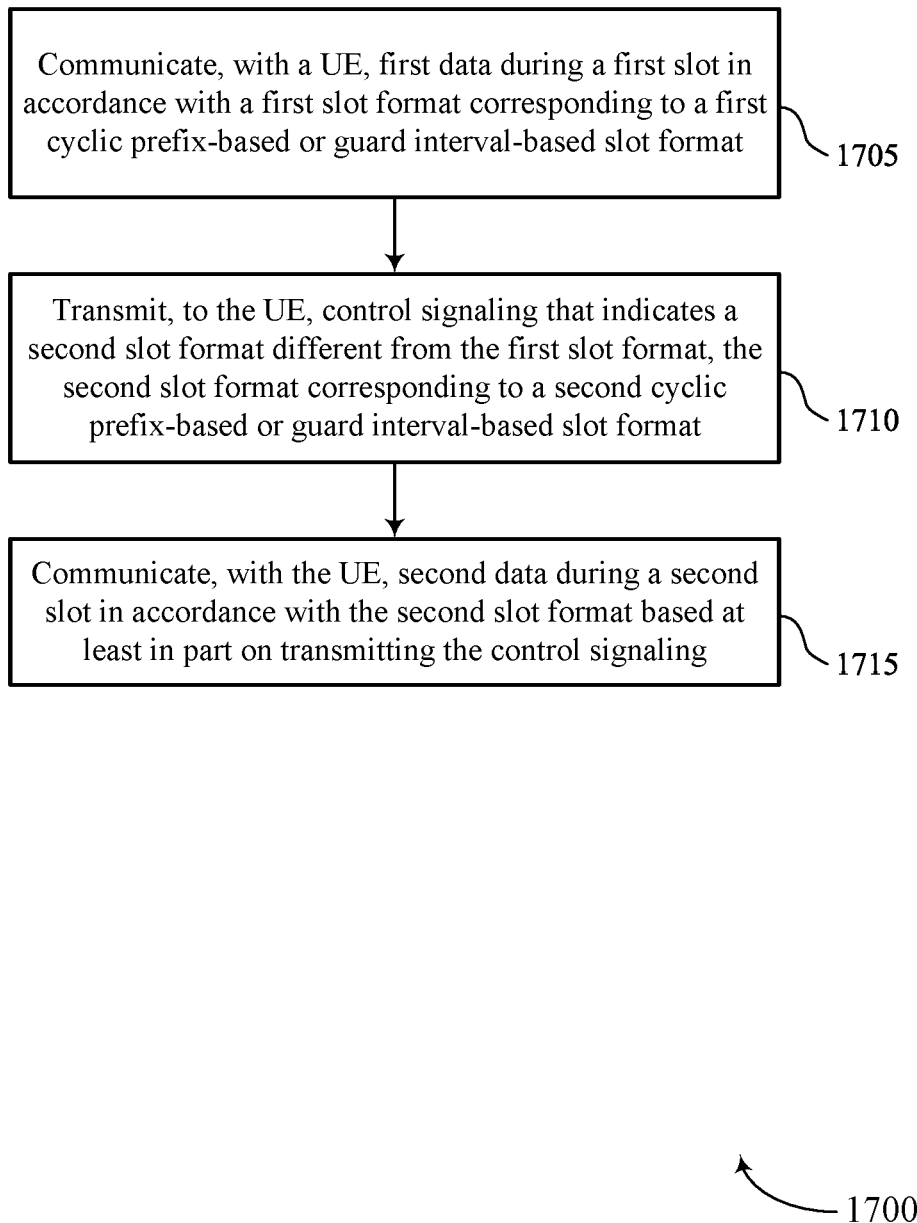

FIG. 17 shows a flowchart illustrating a method 1700 that supports dynamic slot format configuration in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include communicating, with a UE, first data during a first slot in accordance with a first slot format corresponding to a first cyclic prefix-based or guard interval-based slot format. The operations of 1705 may be performed in accordance with examples as disclosed herein. In some examples, aspects of the operations of 1705 may be performed by a data communication component 1325 as described with reference to FIG. 13.

At 1710, the method may include transmitting, to the UE, control signaling that indicates a second slot format different from the first slot format, the second slot format corresponding to a second cyclic prefix-based or guard interval-based slot format. The operations of 1710 may be performed in accordance with examples as disclosed herein. In some examples, aspects of the operations of 1710 may be performed by a control signaling component 1330 as described with reference to FIG. 13.

At 1715, the method may include communicating, with the UE, second data during a second slot in accordance with the second slot format based on transmitting the control signaling. The operations of 1715 may be performed in accordance with examples as disclosed herein. In some examples, aspects of the operations of 1715 may be performed by a data communication component 1325 as described with reference to FIG. 13.

The following provides an overview of aspects of the present disclosure:

Aspect 1: A method for wireless communication at a UE, comprising: communicating first data during a first slot in accordance with a first slot format, the first slot format corresponding to a first cyclic prefix-based or guard interval-based slot format; receiving control signaling that indicates a second slot format different from the first slot format, the second slot format corresponding to a second cyclic prefix-based or guard interval-based slot format; and communicating second data during a second slot in accordance with the second slot format in response to receiving the control signaling.

Aspect 2: The method of aspect 1, wherein the second slot format indicates to communicate using the second slot as a cyclic prefix-based slot, and wherein communicating the second data comprises: communicating at least a portion of the second data and a corresponding cyclic prefix in one or more symbols of a plurality of symbols of the second slot in accordance with the second slot format.

Aspect 3: The method of aspect 1, wherein the second slot format indicates to communicate using the second slot as a non-slot contained guard interval-based slot, and wherein communicating the second data comprises: communicating at least a portion of the second data and a corresponding guard interval in one or more symbols of a plurality of symbols of the second slot in accordance with the second slot format, wherein a first guard interval corresponding to a first symbol of the plurality of symbols is communicated in a slot that is prior to the second slot in time.

Aspect 4: The method of aspect 1, wherein the second slot format indicates to communicate using the second slot as a slot contained guard interval-based slot, and wherein communicating the second data comprises: communicating at least a first portion of the second data and a corresponding guard interval in one or more first symbols of a plurality of symbols of the second slot in accordance with the second slot format.

Aspect 5: The method of aspect 4, wherein the second slot format indicates a reduced symbol duration for one or more second symbols of the plurality of symbols of the second slot, and wherein communicating the second data comprises: communicating at least a second portion of the second data and two or more guard intervals in the one or more second symbols having the reduced symbol duration in accordance with the second slot format, the second portion of the second data comprising fewer bits than the first portion of the second data based at least in part on the reduced symbol duration for the one or more second symbols.

Aspect 6: The method of any of aspects 4 through 5, wherein the second slot format indicates a DFT window size for the second slot, and wherein communicating the second data comprises: communicating at least the first portion of the second data and the corresponding guard interval in the one or more first symbols of the plurality of symbols of the second slot in accordance with the DFT window size and the second slot format, wherein the DFT window size is different from a first DFT window size corresponding to the first slot format.

Aspect 7: The method of any of aspects 4 through 6, wherein the second slot format indicates a signaling period having a first duration that is different from a second duration of each symbol of the plurality of symbols of the second slot, and wherein communicating the second data comprises: communicating a reference signal, at least a second portion of the second data, or any combination thereof during the signaling period, wherein the second slot format indicates a timing of the signaling period within the second slot.

Aspect 8: The method of any of aspects 4 through 7, wherein the second slot format indicates a gap period having a first duration that is different from a second duration of each symbol of the plurality of symbols of the second slot, and wherein communicating the second data further comprises: refraining from communicating during the gap period, wherein the second slot format indicates a timing of the gap period within the second slot.

Aspect 9: The method of any of aspects 1 through 8, wherein the second slot format indicates a second symbol duration for each symbol in the second slot that is different from a first symbol duration corresponding to the first slot format, and wherein communicating the second data comprises: communicating at least a portion of the second data in one or more symbols of a plurality of symbols of the second slot in accordance with the second symbol duration.

Aspect 10: The method of aspect 9, wherein a second slot duration of the second slot, a second quantity of symbols in the second slot, or both are different from a first slot duration of the first slot, a first quantity of symbols in the first slot, or both based at least in part on the second symbol duration being different from the first symbol duration.

Aspect 11: The method of any of aspects 9 through 10, wherein the first symbol duration corresponds to a nominal symbol duration, the method further comprising: falling back to the nominal symbol duration based at least in part on a channel metric failing to satisfy a threshold; and communicating third data in a third slot in accordance with the nominal symbol duration based at least in part on falling back to the nominal symbol duration.

Aspect 12: The method of any of aspects 9 through 11, wherein the second symbol duration is an integer factor of the first symbol duration.

Aspect 13: The method of any of aspects 1 through 8, wherein the second slot format indicates a second DFT window size for the second slot that is different from a first DFT window size for the first slot, and wherein communicating the second data comprises: communicating at least a portion of the second data and a corresponding guard interval or cyclic prefix in one or more symbols of a plurality of symbols of the second slot in accordance with the second DFT window size.

Aspect 14: The method of aspect 13, wherein the first DFT window size corresponds to a nominal DFT window size; and the second DFT window size is smaller than the nominal DFT window size by an amount that is greater than or equal to a duration of the corresponding guard interval or cyclic prefix.

Aspect 15: The method of aspect 14, further comprising: communicating two or more guard intervals, two or more cyclic prefixes, a reference signal, or any combination thereof in the one or more symbols of the plurality of symbols of the second slot based at least in part on the amount by which the second DFT window size is smaller than the nominal DFT window size.

Aspect 16: The method of any of aspects 1 through 15, further comprising: receiving first control signaling configuring a plurality of slot formats comprising at least the first slot format and the second slot format, wherein the control signaling is second control signaling comprising an identifier indicating the second slot format from the plurality of slot formats.

Aspect 17: The method of aspect 16, wherein a slot format of the plurality of slot formats indicates a location and contents of one or more symbols having reduced symbol durations in the second slot.

Aspect 18: The method of any of aspects 1 through 17, further comprising: transmitting a UE capability report, wherein the control signaling indicating the second slot format is received based at least in part on the UE capability report.

Aspect 19: The method of any of aspects 1 through 17, further comprising: transmitting a UE assistance information message requesting the second slot format, wherein the control signaling indicating the second slot format is received based at least in part on the UE assistance information message.

Aspect 20: The method of any of aspects 1 through 19, further comprising: applying the second slot format to the second slot a time period after receiving the control signaling, wherein the time period is indicated by the control signaling, is based at least in part on a UE capability, or both.

Aspect 21: The method of any of aspects 1 through 20, wherein the control signaling indicates an applicability of the second slot format; and the second slot format applies to one or more MIMO layers, one or more TCI states, one or more frequency sub-bands, one or more UE antenna panels, or any combination thereof based at least in part on the applicability of the second slot format.

Aspect 22: The method of any of aspects 1 through 21, wherein the first data and the second data are communicated in FR2.

Aspect 23: A method for wireless communication at a base station, comprising: communicating, with a UE, first data during a first slot in accordance with a first slot format corresponding to a first cyclic prefix-based or guard interval-based slot format; transmitting, to the UE, control signaling that indicates a second slot format different from the first slot format, the second slot format corresponding to a second cyclic prefix-based or guard interval-based slot format; and communicating, with the UE, second data during a second slot in accordance with the second slot format based at least in part on transmitting the control signaling.

Aspect 24: The method of aspect 23, wherein the second slot format indicates to communicate using the second slot as a cyclic prefix-based slot, and wherein communicating the second data comprises: communicating at least a portion of the second data and a corresponding cyclic prefix in one or more symbols of a plurality of symbols of the second slot in accordance with the second slot format.

Aspect 25: The method of aspect 23, wherein the second slot format indicates to communicate using the second slot as a non-slot contained guard interval-based slot, and wherein communicating the second data comprises: communicating at least a portion of the second data and a corresponding guard interval in one or more symbols of a plurality of symbols of the second slot in accordance with the second slot format, wherein a first guard interval corresponding to a first symbol of the plurality of symbols is communicated in a slot that is prior to the second slot in time.

Aspect 26: The method of aspect 23, wherein the second slot format indicates to communicate using the second slot as a slot contained guard interval-based slot, and wherein communicating the second data comprises: communicating at least a portion of the second data and a corresponding guard interval in one or more symbols of a plurality of symbols of the second slot in accordance with the second slot format.

Aspect 27: The method of any of aspects 23 through 26, wherein the second slot format indicates a second symbol duration for each symbol in the second slot that is different from a first symbol duration corresponding to the first slot format, and wherein communicating the second data comprises: communicating at least a portion of the second data in one or more symbols of a plurality of symbols of the second slot in accordance with the second symbol duration.

Aspect 28: The method of any of aspects 23 through 26, wherein the second slot format indicates a second DFT window size for the second slot that is different from a first DFT window size for the first slot, and wherein communicating the second data comprises: communicating at least a portion of the second data and a corresponding guard interval or cyclic prefix in one or more symbols of a plurality of symbols of the second slot in accordance with the second DFT window size.

Aspect 29: An apparatus for wireless communication at a UE, comprising a processor; memory coupled with the processor; and instructions stored in the memory and executable by the processor to cause the apparatus to perform a method of any of aspects 1 through 22.

Aspect 30: An apparatus for wireless communication at a UE, comprising at least one means for performing a method of any of aspects 1 through 22.

Aspect 31: A non-transitory computer-readable medium storing code for wireless communication at a UE, the code comprising instructions executable by a processor to perform a method of any of aspects 1 through 22.

Aspect 32: An apparatus for wireless communication at a base station, comprising a processor; memory coupled with the processor; and instructions stored in the memory and executable by the processor to cause the apparatus to perform a method of any of aspects 23 through 28.

Aspect 33: An apparatus for wireless communication at a base station, comprising at least one means for performing a method of any of aspects 23 through 28.

Aspect 34: A non-transitory computer-readable medium storing code for wireless communication at a base station, the code comprising instructions executable by a processor to perform a method of any of aspects 23 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving first control signaling indicating a configuration of a plurality of slot formats;
   communicating first data during a first slot in accordance with a first slot format of the plurality of slot formats, the first slot format corresponding to a first cycle prefix-based or guard interval-based slot format;
   receiving second control signaling comprising an identifier that indicates a second slot format from the plurality of slot formats, wherein the second slot format is different from the first slot format, the second slot format corresponding to a second guard interval-based slot format; and
   communicating second data during a second slot in accordance with the second slot format in response to receiving the second control signaling.

2. The method of claim 1, wherein the second slot format indicates to communicate using the second slot as a non-slot contained guard interval-based slot, and wherein communicating the second data comprises:
   communicating at least a portion of the second data and a corresponding guard interval in one or more symbols of a plurality of symbols of the second slot in accordance with the second slot format, wherein a first guard interval corresponding to a first symbol of the plurality of symbols is communicated in a slot that is prior to the second slot in time.

3. The method of claim 1, wherein the second slot format indicates to communicate using the second slot as a slot contained guard interval-based slot, and wherein communicating the second data comprises:
   communicating at least a first portion of the second data and a corresponding guard interval in one or more first symbols of a plurality of symbols of the second slot in accordance with the second slot format.

4. The method of claim 3, wherein the second slot format indicates a reduced symbol duration for one or more second symbols of the plurality of symbols of the second slot, and wherein communicating the second data comprises:
   communicating at least a second portion of the second data and two or more guard intervals in the one or more second symbols having the reduced symbol duration in accordance with the second slot format, the second portion of the second data comprising fewer bits than the first portion of the second data based at least in part on the reduced symbol duration for the one or more second symbols.

5. The method of claim 3, wherein the second slot format indicates a discrete Fourier transform window size for the second slot, and wherein communicating the second data comprises:
   communicating at least the first portion of the second data and the corresponding guard interval in the one or more first symbols of the plurality of symbols of the second slot in accordance with the discrete Fourier transform window size and the second slot format, wherein the discrete Fourier transform window size is different from a first discrete Fourier transform window size corresponding to the first slot format.

6. The method of claim 3, wherein the second slot format indicates a signaling period having a first duration that is different from a second duration of each symbol of the plurality of symbols of the second slot, and wherein communicating the second data comprises:
communicating a reference signal, at least a second portion of the second data, or any combination thereof during the signaling period, wherein the second slot format indicates a timing of the signaling period within the second slot.

7. The method of claim 3, wherein the second slot format indicates a gap period having a first duration that is different from a second duration of each symbol of the plurality of symbols of the second slot, and wherein communicating the second data further comprises:
refraining from communicating during the gap period, wherein the second slot format indicates a timing of the gap period within the second slot.

8. The method of claim 1, wherein the second slot format indicates a second symbol duration for each symbol in the second slot that is different from a first symbol duration corresponding to the first slot format, and wherein communicating the second data comprises:
communicating at least a portion of the second data in one or more symbols of a plurality of symbols of the second slot in accordance with the second symbol duration.

9. The method of claim 8, wherein a second slot duration of the second slot, a second quantity of symbols in the second slot, or both are different from a first slot duration of the first slot, a first quantity of symbols in the first slot, or both based at least in part on the second symbol duration being different from the first symbol duration.

10. The method of claim 8, wherein the first symbol duration corresponds to a nominal symbol duration, the method further comprising:
falling back to the nominal symbol duration based at least in part on a channel metric failing to satisfy a threshold; and
communicating third data in a third slot in accordance with the nominal symbol duration based at least in part on falling back to the nominal symbol duration.

11. The method of claim 8, wherein the second symbol duration is an integer factor of the first symbol duration.

12. The method of claim 1, wherein the second slot format indicates a second discrete Fourier transform window size for the second slot that is different from a first discrete Fourier transform window size for the first slot, and wherein communicating the second data comprises:
communicating at least a portion of the second data and a corresponding guard interval in one or more symbols of a plurality of symbols of the second slot in accordance with the second discrete Fourier transform window size.

13. The method of claim 12, wherein:
the first discrete Fourier transform window size corresponds to a nominal discrete Fourier transform window size; and
the second discrete Fourier transform window size is smaller than the nominal discrete Fourier transform window size by an amount that is greater than or equal to a duration of the corresponding guard interval.

14. The method of claim 13, further comprising:
communicating two or more guard intervals, a reference signal, or any combination thereof in the one or more symbols of the plurality of symbols of the second slot based at least in part on the amount by which the second discrete Fourier transform window size is smaller than the nominal discrete Fourier transform window size.

15. The method of claim 1, wherein a slot format of the plurality of slot formats indicates a location and contents of one or more symbols having reduced symbol durations in the second slot.

16. The method of claim 1, further comprising:
transmitting a UE capability report, wherein the second control signaling indicating the second slot format is received based at least in part on the UE capability report.

17. The method of claim 1, further comprising:
transmitting a UE assistance information message requesting the second slot format, wherein the second control signaling indicating the second slot format is received based at least in part on the UE assistance information message.

18. The method of claim 1, further comprising:
applying the second slot format to the second slot a time period after receiving the second control signaling, wherein the time period is indicated by the second control signaling, is based at least in part on a UE capability, or both.

19. The method of claim 1, wherein:
the second control signaling indicates an applicability of the second slot format; and
the second slot format applies to one or more multiple input-multiple output layers, one or more transmission configuration indicator states, one or more frequency sub-bands, one or more UE antenna panels, or any combination thereof based at least in part on the applicability of the second slot format.

20. The method of claim 1, wherein the first data and the second data are communicated in frequency range 2.

21. A method for wireless communication at a base station, comprising:
transmitting first control signaling configuring a plurality of slot formats;
communicating, with a user equipment (UE), first data during a first slot in accordance with a first slot format of the plurality of slot formats, the first slot format corresponding to a first cyclic prefix-based or guard interval-based slot format;
transmitting, to the UE, second control signaling comprising an identifier that indicates a second slot format from the plurality of slot formats, wherein the second slot format is different from the first slot format, the second slot format corresponding to a second guard interval-based slot format; and
communicating, with the UE, second data during a second slot in accordance with the second slot format based at least in part on transmitting the second control signaling.

22. The method of claim 21, wherein the second slot format indicates to communicate using the second slot as a non-slot contained guard interval-based slot, and wherein communicating the second data comprises:
communicating at least a portion of the second data and a corresponding guard interval in one or more symbols of a plurality of symbols of the second slot in accordance with the second slot format, wherein a first guard interval corresponding to a first symbol of the plurality of symbols is communicated in a slot that is prior to the second slot in time.

23. The method of claim 21, wherein the second slot format indicates to communicate using the second slot as a slot contained guard interval-based slot, and wherein communicating the second data comprises:
communicating at least a portion of the second data and a corresponding guard interval in one or more symbols of a plurality of symbols of the second slot in accordance with the second slot format.

24. The method of claim 21, wherein the second slot format indicates a second symbol duration for each symbol in the second slot that is different from a first symbol duration corresponding to the first slot format, and wherein communicating the second data comprises:
communicating at least a portion of the second data in one or more symbols of a plurality of symbols of the second slot in accordance with the second symbol duration.

25. The method of claim 21, wherein the second slot format indicates a second discrete Fourier transform window size for the second slot that is different from a first discrete Fourier transform window size for the first slot, and wherein communicating the second data comprises:
communicating at least a portion of the second data and a corresponding guard interval in one or more symbols of a plurality of symbols of the second slot in accordance with the second discrete Fourier transform window size.

26. An apparatus for wireless communication at a user equipment (UE), comprising:
a processor;
memory coupled with the processor; and
instructions stored in the memory and executable by the processor to cause the apparatus to:
receive first control signaling indicating a configuration of a plurality of slot formats;
communicate first data during a first slot in accordance with a first slot format of the plurality of slot formats, the first slot format corresponding to a first cyclic prefix-based or guard interval-based slot format;
receive second control signaling comprising an identifier that indicates a second slot format from the plurality of slot formats, wherein the second slot format is different from the first slot format, the second slot format corresponding to a guard interval-based slot format; and
communicate second data during a second slot in accordance with the second slot format in response to receiving the second control signaling.

27. An apparatus for wireless communication at a base station, comprising:
a processor;
memory coupled with the processor; and
instructions stored in the memory and executable by the processor to cause the apparatus to:
transmitting first control signaling indicating a configuration of a plurality of slot formats;
communicate, with a user equipment (UE), first data during a first slot in accordance with a first slot format of the plurality of slot formats, the first slot format corresponding to a first cyclic prefix-based or guard interval-based slot format;
transmit, to the UE, second control signaling that indicates a second slot format from the plurality of slot formats, wherein the second slot format is different from the first slot format, the second slot format corresponding to a second guard interval-based slot format; and
communicate, with the UE, second data during a second slot in accordance with the second slot format based at least in part on transmitting the second control signaling.

* * * * *